United States Patent
Webster

(10) Patent No.: US 9,509,548 B2
(45) Date of Patent: Nov. 29, 2016

(54) MULTIMEDIA AGGREGATION TECHNIQUE BASED ON RSS FEEDS

(71) Applicant: CBS INTERACTIVE INC., San Francisco, CA (US)

(72) Inventor: John Clayton Webster, Flemington, NJ (US)

(73) Assignee: CBS Interactive Inc., New York, NY (US)

( * ) Notice: Subject to any disclaimer, the term of this patent is extended or adjusted under 35 U.S.C. 154(b) by 496 days.

(21) Appl. No.: 13/647,387

(22) Filed: Oct. 9, 2012

(65) Prior Publication Data

US 2014/0101304 A1 Apr. 10, 2014

(51) Int. Cl.
*G06F 15/173* (2006.01)
*H04L 29/08* (2006.01)

(52) U.S. Cl.
CPC ......... *H04L 29/08099* (2013.01); *H04L 67/02* (2013.01); *H04L 67/26* (2013.01)

(58) Field of Classification Search
None
See application file for complete search history.

(56) References Cited

U.S. PATENT DOCUMENTS

| | | |
|---|---|---|
| 8,566,330 B1* | 10/2013 | Barak et al. .................. 707/748 |
| 8,656,040 B1* | 2/2014 | Bajaj et al. .................. 709/231 |
| 2010/0083124 A1* | 4/2010 | Druzgalski et al. .......... 715/738 |
| 2010/0228720 A1* | 9/2010 | Wormald et al. ............. 707/710 |
| 2011/0184809 A1* | 7/2011 | Beavers et al. ............ 705/14.64 |

* cited by examiner

*Primary Examiner* — John B Walsh

(57) ABSTRACT

A technique to determine trending data based on the aggregation of RSS feeds received from a networking site or system is described. A computer-implemented method monitors a link path from a source for a request feed. The request feed is read and a determination is made as to which one or more of a plurality of web sites the request feed is associated with. The number of request feeds associated with particular ones of the plurality of web sites is aggregated. A determination is made, based on the number of aggregated request feeds what multimedia content is displayed.

20 Claims, 17 Drawing Sheets

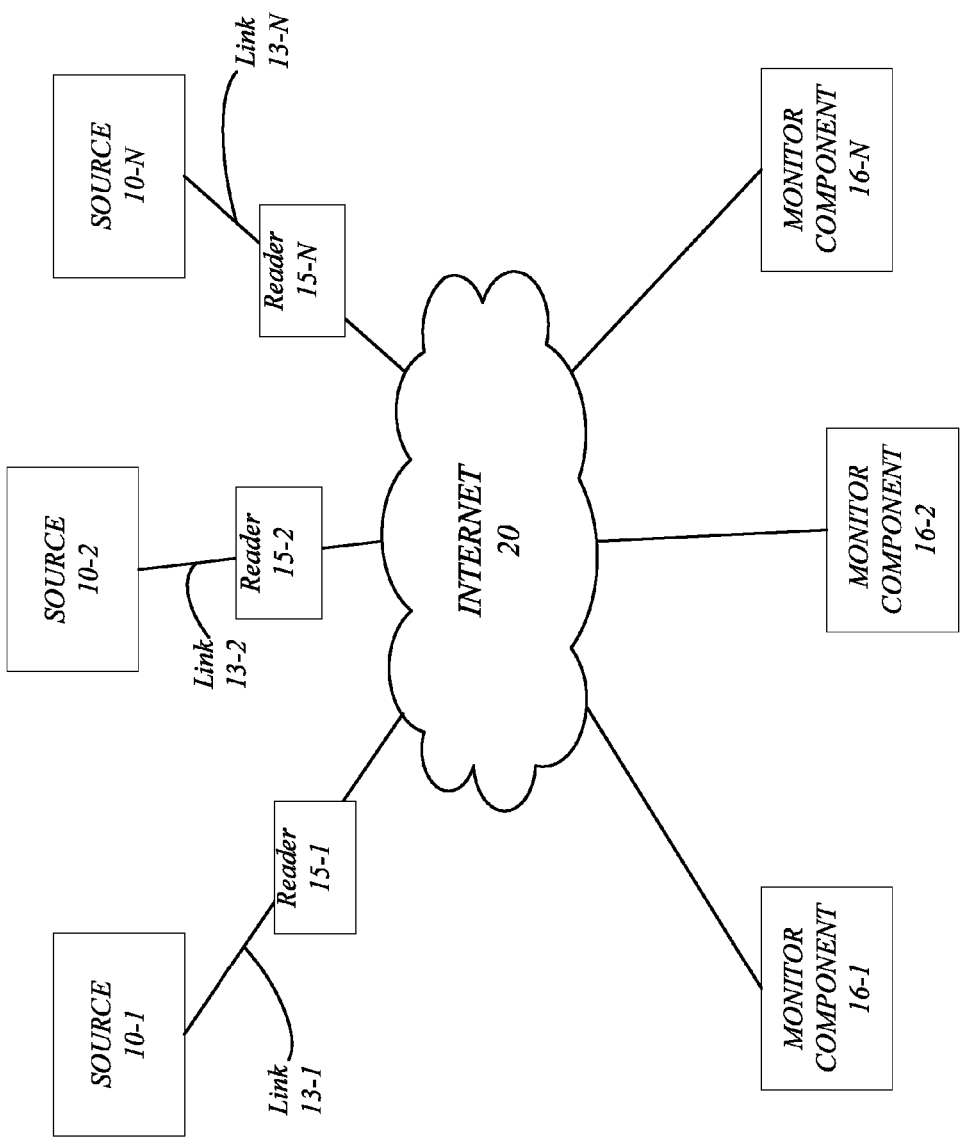

MULTIMEDIA AGGREGATION TECHNIQUE BASED ON RSS FEEDS

BACKGROUND

The present disclosure generally relates to processing of online requests for content and more particularly to a method and apparatus for aggregating multimedia content requests based on RSS feeds to monitor trending data and generate content specific multimedia pages based on the trending data.

The amount of multimedia content available to online users has grown dramatically over the recent past. Some users access this multimedia content as "followers" where the multimedia information and updates to such information related to one or more topics is indicated as being of interest to the user and may be pushed to the user by the content provider. Content hosting services also exist that allow users to create user profiles that include demographic information which is used to select multimedia content that may be of interest to the user. Another way to access this multimedia content is through the use of online social networking sites. In particular, multimedia content may be shared by a user via a profile or landing page, maintained by a user, on an online social networking site. Typically, a user may save hypertext representing a hyperlink to particular multimedia content such as, for example, a webpage, a video, a document, etc., on the user's profile or landing page. Although the hyperlink is saved on the user's profile or landing page, the multimedia content itself is usually from a third party source saved on a remote server or system. Each time a user selects the hyperlink, the current version of the multimedia content saved by the third party source is accessed and displayed. Content providers are typically interested to know which of their content is most popular among users especially content accessed by users of social networking applications. Unfortunately, these social networking sites may have particular requirements to allow content providers to retrieve use data to determine trending information about how many social networking users are accessing its multimedia content, what types of content users are accessing and when they are accessing this content. This data retrieval is usually provided for by social networking sites through the use of an Application Programming Interface (API) which allows content providers to access the various systems to download use data. Unfortunately, retrieving this data from the social networking site via an API on a regular basis to provide trending interest patterns among users isn't feasible with current social networking system requirements and processing bandwidth.

Certain applications exist today that allow users to manage their social media content and other favorite web sites into various formats. For example, Flipboard is a social-network aggregation system that organizes a user's social media content and favorite web sites into a format to allow the user to "flip" through their selected content. However, the content within Flipboard is defined by the user. Another example of such an application is Google Currents which sorts multimedia content by topics from particular sources. However, these content applications do not provide a means for managing multimedia content based on trending topics/stories that users are sharing via social networking sites. In addition, present multimedia content aggregation is not distinguished by the source of the multimedia content or by the content provider. In other words, existing applications do not provide information about where and how a user accesses particular multimedia content rather than just by the mere fact that a user accesses certain content to determine trending topics. It would be useful to provide multimedia content based on trending data representing sharing activity of such content by users of social networking sites in order to provide consolidated multimedia content information and targeted advertising based on this trending data. It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to an aggregation system and method. Some embodiments are particularly directed to techniques to determine trending data based on the aggregation of feeds received from various sources and read by a corresponding reader. For example, the feeds may be RSS feeds received from sources such as social networking sites or systems and read by a corresponding RSS reader. In one embodiment, an apparatus may comprise a machine readable storage media encoded with instructions, a processor circuit, a monitor component and an aggregation application each operative on the processor circuit. The monitor component may be an RSS monitor component operative on the processor circuit to receive an RSS feed associated with a particular destination web site. The aggregation application, also operative on the processor circuit, receives the RSS feeds associated with the destination web site, aggregates the number of RSS feeds and selects multimedia content based on the aggregated number of RSS feeds received for the destination web site.

In one embodiment, for example, a computer-implemented method comprises monitoring a link path from a source for a request feed. The request feed, which may be an RSS feed, is read and a determination is made as to which one or more of a plurality of web sites the request feed is associated with. The number of request feeds associated with particular ones of the plurality of web sites is aggregated. A determination is made, based on the number of aggregated request feeds what multimedia content to display to a user.

To accomplish the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 1A illustrates an embodiment of a multimedia aggregation system.

DETAILED DESCRIPTION

Figure 1B:
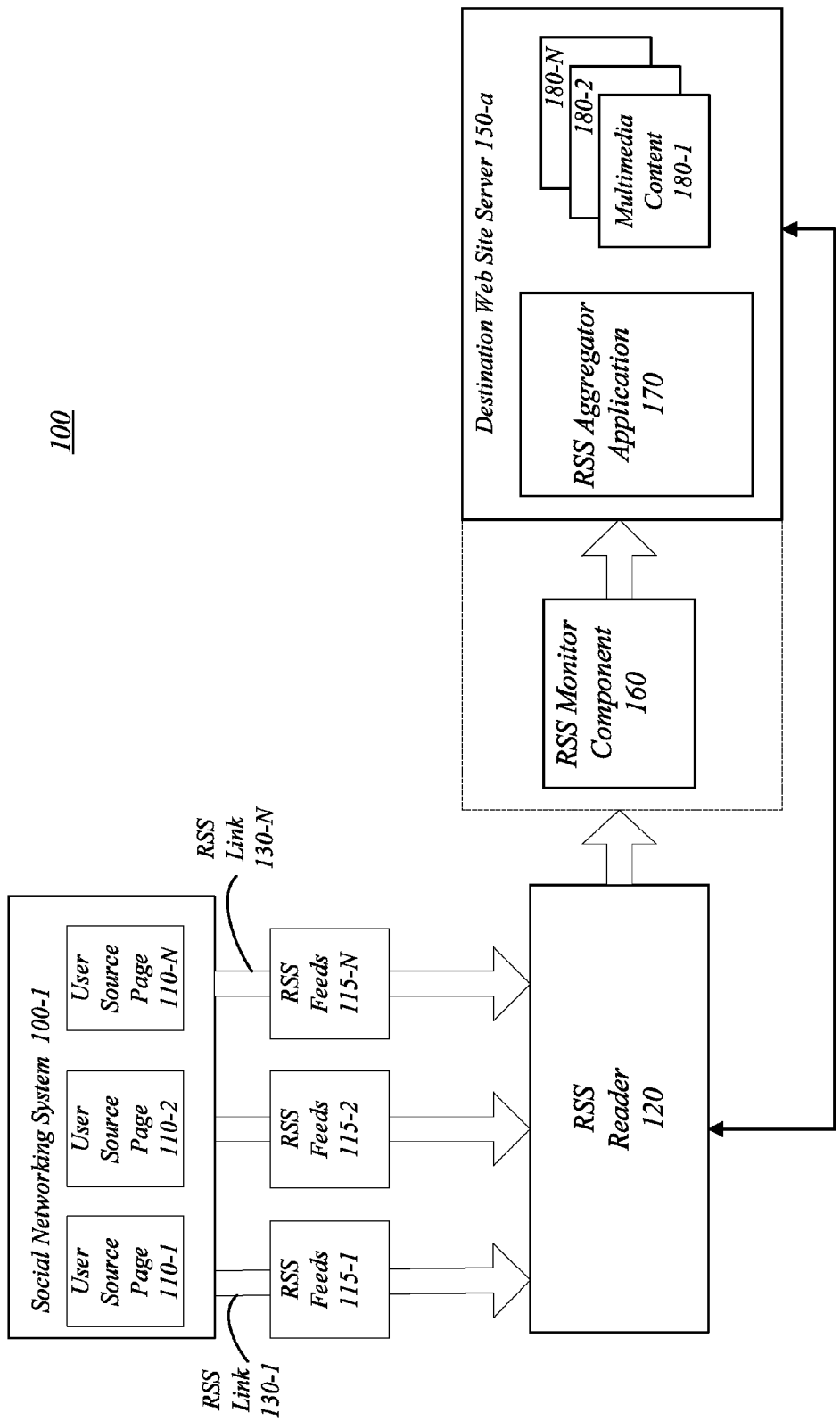
FIG. 1B illustrates an embodiment of a multimedia aggregation system.

Various embodiments are generally directed to an aggregation system and method. Some embodiments are particularly directed to techniques to determine trending data based on the aggregation of feeds for one or more particular web sites received and read by a reader. RSS feeds are used to describe the methods and techniques for implementation of the disclosed embodiments. It should be understood that various types of feeds may be monitored by the monitor component (e.g. 160) and aggregated by the aggregation application (e.g. 170) and still fall within the scope of the present disclosure. As used herein, the term "RSS" means Really Simple Syndication and an RSS feed are simple text files that allow updates to content via standardized formats.

Previously, content providers were limited in determining the frequency of trending information by users accessing their content since certain networking sites either restricted access to trending data information and/or required the content provider to access a specific API to retrieve this trending data which has capacity constraints in view of the large number of users. The present disclosure obviates the need for content providers to rely on networking sites to provide trending data information by monitoring RSS feeds received by an RSS reader and aggregating these RSS feeds associated with web pages of the content provider. In this manner, content providers may track content being shared among users of social networking platforms without the need for reliance of interfaces controlled by these social networking sites. The aggregation techniques described herein can be used in connection with any type of subscription content requested by a user and any type of content. In particular, the techniques described herein may benefit content providers that support syndication of their content automatically to users who want to subscribe to updates from the content provider's web site(s). Moreover, content providers may benefit from these techniques to allow them to track what content is most popular to users and adjust their content offerings accordingly. In certain embodiments described herein, a system is provided that monitors feeds received by readers generated by a source which may be, for example, a user's profile page from a social networking site. The feeds may correspond to a particular webpage or web site that includes multimedia content supplied by a content provider or publisher. The feeds or links are analyzed and the link information is extracted from the feed to determine if the feed is associated with a particular web page or web site supported by the content provider. These monitored links are aggregated to determine which content provided by the content provider is most popular among users utilizing these links or feeds. Based on the volume of these feeds or links, trending data may be determined which represents trending user interest which may be used by content providers to manage their multimedia content.

The above techniques may be implemented in an apparatus or system comprising a machine readable storage media encoded with instructions, a processor circuit, a monitor component and an aggregation application each operative on the processor circuit. The monitor component is operative on the processor circuit to receive these feeds or links associated with particular destination web sites. The aggregation application which operates on the processor circuit receives the feeds or links associated with the destination web site of an identified content provider, aggregates the number of feeds and selects multimedia content based on the aggregated number of feeds received for the destination web site. Some embodiments are particularly directed to techniques for monitoring a link path from a source for a request feed. The request feed, which may be an RSS feed, is read and a determination is made as to which one or more of a plurality of web sites the request feed is associated with. The number of request feeds associated with particular ones of the plurality of web sites is aggregated. A determination is made, based on the number of aggregated request feeds what multimedia content is displayed.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1A generally illustrates a network 10 having a plurality of sources 10-1 . . . 10-N each of which may communicate using internet 20 via links 13-1 . . . 13-N respectively. The sources 10-1 . . . 10-N may be a web page associated with a profile or user page within a social networking system, for example. In one embodiment, the network 10 includes a plurality of readers 15-1 . . . 15-N disposed between the sources 10-1 . . . 10-N and internet 20. Each of the plurality of readers 15-1 . . . 15-N is essentially a software program configured to read feeds from each of the sources 10-1 . . . 10-N. These readers may already exist as part of the sources 10-1 . . . 10-N or as stand-along applications running on third party server platforms. For example, a user may store a webpage address in the form of a link on source 10-1. This link may be a document in Extensible Markup Language (XML) format, such as an RSS (Really Simple Syndication) feed that contains either a summarized or unabridged version of web content from a destination web site. The sources 10-1 . . . 10-N may communicate with Internet 20 over respective links 13-1 . . . 13-N using standard HTTP (Hypertext Transfer Protocol) or HTTPS (Hypertext Transfer Protocol Secure)

protocols. As referred to herein, whenever the term HTTP is used it should be understood to include HTTPS. Likewise, whenever the term HTTPS is used it should be understood to include HTTP. The readers 15-1 . . . 15-N may be RSS readers used to read RSS feeds, for example. These feeds are used to publish frequently updated web content (e.g. from a web site) such that once content is identified, a feed is built and the reader 15-1 . . . 15-N reads the feed and displays the content from a content provider or publisher. RSS feeds benefit content providers by allowing them to syndicate content automatically to users. An RSS feed is initiated by a user by, for example, adding a link to a particular web site on the user's home page, profile page, etc. The RSS feed itself is an XML formatted file that includes descriptions and links to specific content. RSS readers 15-1 . . . 15-N determine if an RSS feed has new content or information by checking the user identified feeds on a predetermined schedule. In other words, RSS readers 15-1 . . . 15-N compare a downloaded RSS feed with a previous RSS feed. If the feeds are not the same, the RSS reader downloads the new RSS feed and displays the corresponding content to a user or source 10-1 . . . 10-N. Typically, an RSS reader pulls information from the RSS feed in order to update the content. Certain of these readers may be included within web browser applications and some may be stand alone interfaces. The RSS readers 15-1 . . . 15-N may check the user's subscribed feeds regularly for new content and download the updates.

Monitor components 16-1 . . . 16-N communicate with each of the readers 15-1 . . . 15-N via Internet 20. Each of the monitor components 16-1 . . . 16-N essentially monitors when a reader 15-1 . . . 15-N receives a link or feed from a respective source 10-1 . . . 10-N associated with a particular webpage or web site. As noted above, each of the readers 15-1 . . . 15-N provides link information from a respective one of the sources 10-1 . . . 10-N associated with a particular webpage and/or content on a particular webpage. Each monitor component 16-1 . . . 16-N analyzes the feed, extracts the link information within the feed, and determines if the feed is associated with a webpage relevant to the content provider. It should be understood that the network 10 shown in FIG. 1 has a limited number of elements in a certain topology and is generally intended for explanatory purposes. It may be appreciated that the system 10 may include more or less elements in alternate topologies as desired for a given implementation. The designations "a" and "b" and "c" and "n" and similar alphabetic designators as used herein are intended to be variables representing any positive integer. Thus, for example, if an implementation sets a value for N=5, then a complete set of components 122-N may include components 122-1, 122-2, 122-3, 122-4 and 122-5. The embodiments are not limited in this context.

FIG. 1B illustrates an exemplary embodiment of system 100 which polls RSS feeds to determine trending content based on link information contained within the RSS feeds. For example, a networking system 100-1 (e.g. social networking system) may include a plurality of user source pages 110-1 . . . 110-N. These source pages may be profile pages, home pages, etc. A user may save a link to a particular web page or web site on the profile page which may be defined as a source page (e.g. 110-1). A communication link 130-1 . . . 130-N may be configured between the user source pages 110-1 . . . 110-N and RSS reader 120. Links 130-1 . . . 130-N may be physical or logical links between the social networking system 100-1 and RSS reader 120. Each of the RSS links 130-1 . . . 130-N is configured to accommodate RSS feeds 115-1 . . . 115-N. A user of the social networking system 100-1 may subscribe to a particular RSS feed 115-1 . . . 115-N by clicking an RSS icon in a web-browser, for example. The RSS icon is associated with an application that initiates the subscription process to a particular webpage corresponding to the RSS feed 115-1 . . . 115-N. RSS reader 120 reads each of the RSS feeds 115-1 . . . 115-N received via link 130-1 . . . 130-N and polls the respective RSS feed subscribed to by a user for new content. The RSS readers 115-1 . . . 151-N may check the user's subscribed feeds regularly for new content. When updates to the content are available, the content is downloaded with the RSS feed 115-1 . . . 115-N. The syndicated content the RSS reader 120 retrieves is usually supplied in the form of RSS or other XML formatted data, but alternative formats may also be available.

RSS monitor component communicates with RSS reader 120 to monitor the RSS feeds 115-1 . . . 115-N received by the RSS reader associated with particular destination web sites. In particular, the RSS monitor component 160 monitors the RSS feed from reader 120, parses the RSS feed containing the XML file, and identifies the link address contained in the parsed XML file including the source of the RSS feed. RSS monitor component 160 may be an example of monitor component 16-1 shown in FIG. 1. The RSS monitor component 160 may be part of destination web site stored on destination web site server 150-a or may be a separate interface disposed between RSS reader 120 and destination web site server 150-a. It's important to note that destination web site stored on destination web site servers 150-a may be representative of an HTML (Hypertext Markup Language) document of a webpage or links to web pages and other types of digital media stored on a server (not shown). An RSS aggregator application 170 may be housed within destination web site servers 150-a and communicate with the RSS monitor component 160. In particular, the RSS aggregator application 170 is configured to receive the identification information from the RSS monitor component 160 and, based on the number and link address information contained in the RSS feeds 115-1 . . . 115-N, determine trending data to be displayed as multimedia content 180-1 . . . 180-N via destination web site servers 150-a as described in more detail herein. In addition, the RSS feeds 115-1 . . . 115-N monitored by RSS monitor component may be analyzed within temporal parameters to determine these trending data requirements. In other words, the RSS feeds 115-1 . . . 115-N received from user source pages 110-1 . . . 110-N may be monitored by RSS monitor component 160 and aggregated by RSS aggregator application 170 during a defined temporal window to determine trending data. For example, if RSS feeds 115-1 . . . 115-N received during a previous two (2) hour window are all related to a particular developing news story on a news web site (e.g., www.cbs.com), then the RSS aggregator application determines this trending data interest based on the RSS feeds 115-1 . . . 115-N corresponding to the news web site. The link information associated with the RSS feeds 115-1 . . . 115-N is monitored by RSS monitor component 160 and aggregated by RSS aggregator application 170 to determine the number of RSS feeds 115-1 . . . 115-N that correspond to the news web site. Based on the volume of these RSS feeds corresponding to the exemplary news web site as aggregated by RSS aggregator application 170, trending data may be determined and multimedia content associated with the trending data may be displayed. In this manner, trending data information may be obtained based on the content viewed on a particular one of or a group of web sites. This trending data may also be determined by the source of the RSS feeds read by reader 120 and monitored by RSS monitor component 160 as described in more detail below.

Figure 1C:
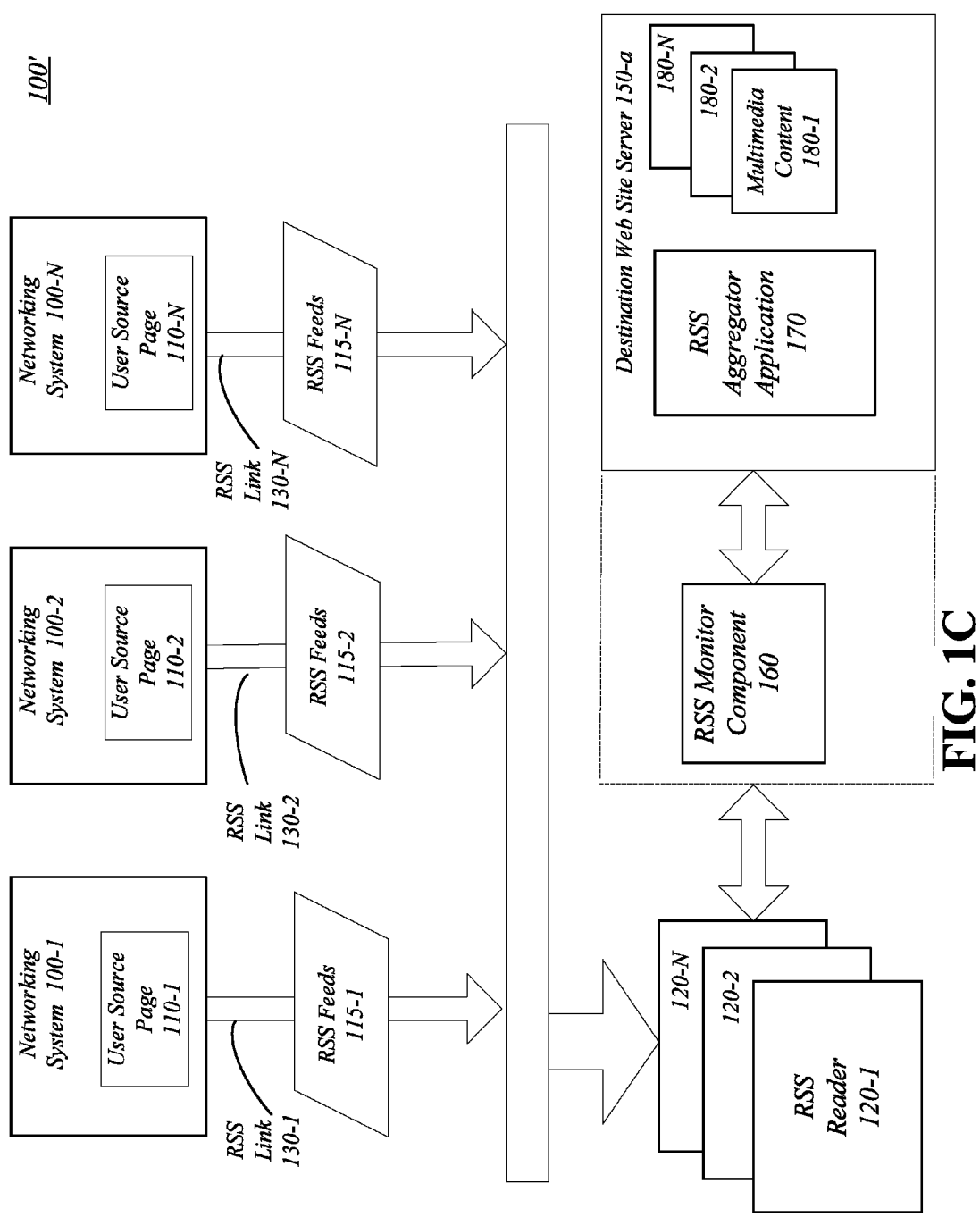
FIG. 1C illustrates an embodiment of a multimedia aggregation system.

FIG. 1C illustrates an exemplary embodiment of system 100 which utilizes a plurality of RSS readers 120-1 . . . 120-N associated with a plurality of RSS feeds 115-1 . . . 115-N. Similar to system 100 shown in FIG. 1B, system 100' polls RSS feeds 115-1 . . . 115-N to determine trending content based on link information contained within the RSS feeds. However, the system 100' of FIG. 1C utilizes a plurality of RSS readers 120-1 . . . 120-N corresponding to each of the RSS feeds 115-1 . . . 115-N as opposed to an individual reader 120 for the RSS feeds. In particular, networking systems 100-1 . . . 100-N may include user source or profile pages 110-1 . . . 110-N respectively. Communication links 130-1 . . . 130-N may be disposed between the user source pages 110-1 . . . 110-N or networking systems 110-1 . . . 110-N and RSS readers 120-1 . . . 120-N. A particular RSS feed 115-1 . . . 115-N is supplied via link 130-1 . . . 130-N and read by a corresponding one of the RSS readers 120-1 . . . 120-N. Again, each of the RSS feeds 115-1 . . . 115-N may be stored on a user's home or profile page and used to update frequently published web content in that once content is identified, a feed is built and the readers 115-1 . . . 115-N read the feeds and display the associated content. Once the feeds 115-1 . . . 115-N are read by the appropriate reader 120-1 . . . 120-N, RSS monitor component 160 monitors the feeds to determine if a feed is associated with one or more particular web sites or web pages. In particular, RSS monitor component 160 parses each of the received RSS feeds to identify the link address contained in the RSS feed. The RSS monitor component 160 compares the link address information with one or more of a plurality of destination sources associated with particular saved link addresses. If the link address parsed from the RSS feed 115-1 . . . 115-N matches a stored link, then the address information from the RSS feed is passed to RSS aggregator application 170. RSS monitor component 160 may be part of or stored on destination web site servers 150-a or may be a separate interface disposed between the RSS readers 120-1 . . . 120-N and destination web site servers 150-a. Previously, content providers were limited in determining the frequency of trending information by users accessing their content since certain networking sites either restricted access to trending data information and/or required the content provider to access a specific API to retrieve this trending data which has capacity constraints in view of the large number of users. The present disclosure obviates the need for content providers to rely on networking sites to provide trending data information by monitoring RSS feeds received by an RSS reader and aggregating these RSS feeds associated with web pages of the content provider. In this manner, content providers may track content being shared among users of social networking platforms without the need for reliance of interfaces controlled by these social networking sites. The RSS aggregator application 170 may be housed within destination web site servers 150-a which communicates with the RSS monitor component 160. In particular, the RSS aggregator application is configured to receive the identification information from the RSS monitor component 160 and, based on the number and source of the RSS feeds 115-1 . . . 115-N, determines trending data to be displayed as multimedia content 180-1 . . . 180-N via destination web site servers 150-a. In particular, the link information associated with the RSS feeds 115-1 . . . 115-N is extracted and identified by RSS monitor component 160 and then aggregated by RSS aggregator application 170 to determine the number of RSS feeds 115-1 . . . 115-N that correspond to a particular web site to determine trending interest by users. In addition, the RSS feeds 115-1 . . . 115-N monitored by RSS monitor component may be analyzed within temporal parameters. Based on the volume of these RSS feeds, trending data may be determined and multimedia content associated with the trending data may be displayed.

Figure 2:
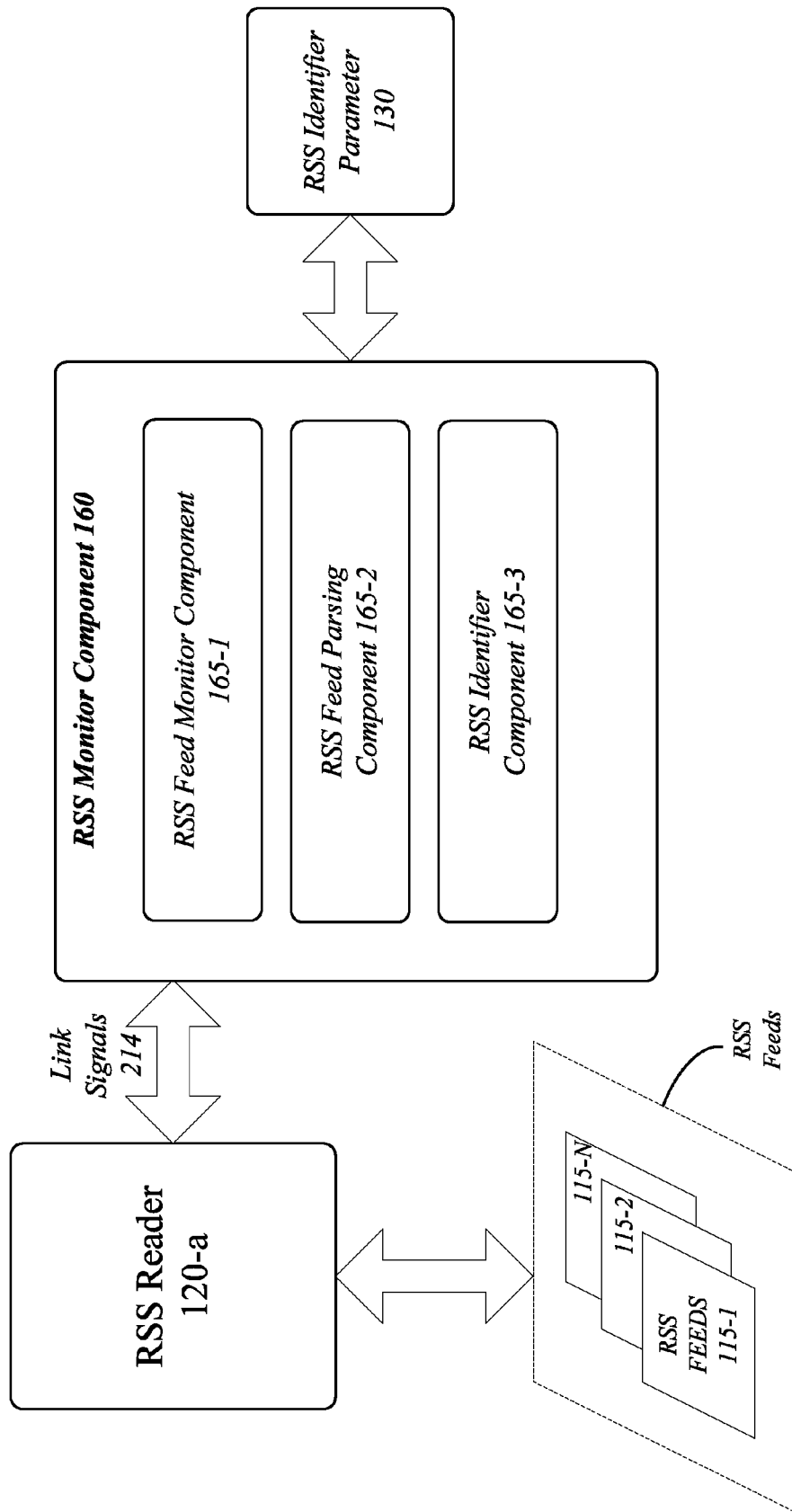
FIG. 2 illustrates an embodiment of an operating environment.

FIG. 2 illustrates an embodiment of an operating environment 200. The operating environment 200 illustrates a more detailed implementation of RSS monitor component 200 including RSS feed monitor 165-1, RSS feed parsing component 165-2, and RSS identifier component 165-3. The RSS monitor component 160 may generally be arranged to receive, monitor, parse or extract and identify link address information contained in an RSS feed. It may be appreciated that more or less components 165-a may be used for a given implementation. The embodiments are not limited in this context. In the illustrated embodiment shown in FIG. 2, the RSS monitor component may include RSS feed monitor 165-1 which monitors the feeds received by RSS reader 120-a each time an RSS feed 115-1 . . . 115-N is read by the reader. Once an RSS feed is detected, the RSS feed 115-a may be communicated from RSS reader 120-a to RSS monitor component 160 using link signals 214. In other words, once the RSS reader reads a particular RSS feed 115-a, the RSS feed monitor 165-1 recognizes the presence of the RSS feed and passes the RSS feed to RSS feed parsing component 165-2. RSS feed parsing component 165-2 parses the feed information received from RSS feed monitor component 165-1 to extract information from the feed including the link address associated with the RSS feed. RSS feed parsing component 165-2 may also be configured to extract additional information contained in the RSS feed such as title, description, publication date, etc. The RSS feed parsing component then sends the parsed RSS feed information to RSS identifier component 165-3. The RSS identifier component 165-3 compares the link address information with one or more of a plurality of destination sources associated with particular saved link addresses. If the link address parsed from the RSS feed matches a stored link, then an RSS identifier parameter 130, is sent to RSS aggregator application 170.

In one exemplary use scenario, an RSS feed is read by RSS reader 120-a. The RSS feed itself is an XML formatted file that includes text information and metadata such as a publishing date, a link address, author information, etc. Since the XML file format is standardized, the RSS feed is processed by various applications, such as by RSS reader 120-a as well as RSS feed monitor 165-1 of RSS monitor component 160. In addition, the XML formatted RSS feed may be transferred on a standard communication protocol such as, for example, HTTP or File Transfer Protocol (FTP), via Internet 20 shown in FIG. 1 to accommodate file retrieval by RSS monitor component 160. The RSS feed may be associated with a particular web site such as, for example, a news web site that a user subscribes to in order to obtain updates to content sourced by the news web site. RSS feeds are typically employed by users to retrieve the latest content from sites that the user is interested in. In particular, RSS obviates the need to visit the particular web sites individually and repeatedly in order to obtain the latest information. Many web sites and online publishers syndicate their content as an RSS feed so that a user may add the RSS link to the user's home page or profile page contained in a social networking site, for example, and the user receives updated content from the publishers on a regular basis or when content has been updated by the content provider.

The RSS monitor component 160 detects that an RSS feed 115-a has been read by RSS reader 120-a and pulls the information contained in the XML formatted RSS feed from the RSS reader 120-a. The RSS feed monitor component 165-1 forwards the RSS feed 115-a from the RSS reader to the RSS feed parsing component 165-2 which then extracts various information from the RSS feed 115-a including link information (e.g. http://) associated with the news web site, for example. The RSS identifier component 165-3 receives at least the link information from the RSS feed parsing component 165-2 and determines if the link information corresponds to one of a plurality of web sites or web pages. Based on the comparison of the received RSS link information with the stored addresses, RSS monitor component 160 generates RSS identifier parameter 130 which is essentially a counter of how many RSS feeds 115-1 . . . 115-N processed by RSS monitor component 160 correspond to particular web sites or web pages of a content provider. The RSS identifier parameter 130 is sent to RSS aggregator application 170 for further processing.

Figure 3:
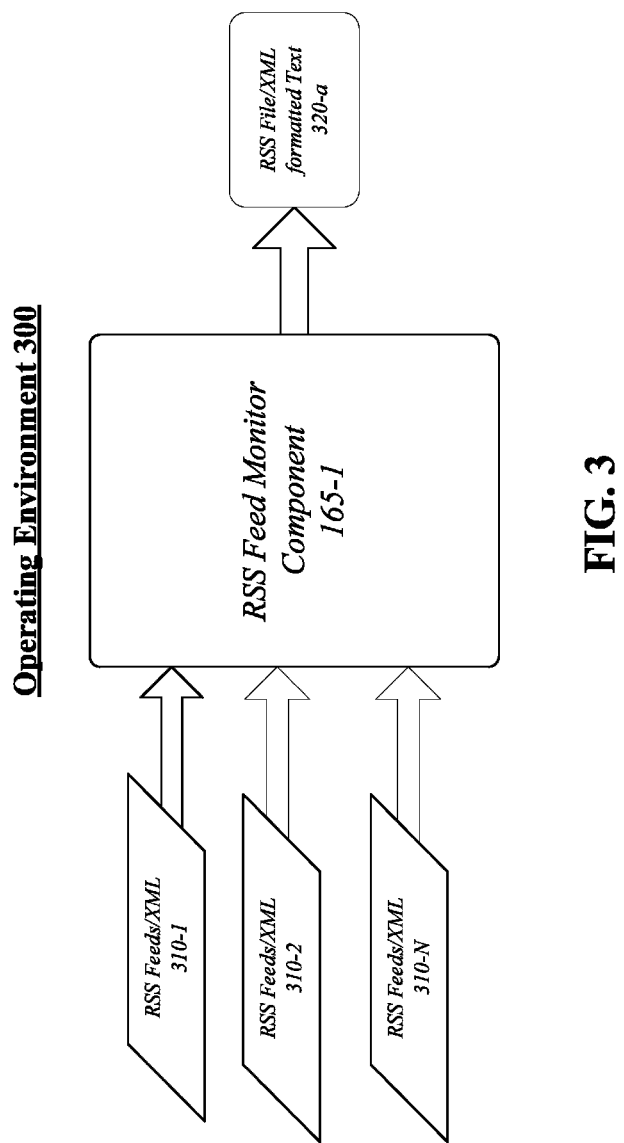
FIG. 3 illustrates an embodiment of an operating environment.

FIG. 3 illustrates an embodiment of an operating environment 300. The operating environment 300 illustrates a more detailed implementation of the RSS feed monitor 165-1 of the RSS monitor component 160 used to monitor RSS feeds received by RSS reader 120-a. As shown in the operating environment 300, the RSS feed monitor component may be arranged to receive, monitor and process XML formatted RSS feeds 310-1 . . . 310-N. It may be appreciated that alternative formats for RSS feeds 310-1 . . . 310-N may be used for a given implementation. The embodiments are not limited in this context. Each RSS feed that is read by RSS reader 120-1 is also monitored by RSS feed monitor component 165-1. The XML formatted RSS feeds 310-1 . . . 310-N is extracted by RSS monitor component 160 and provided to RSS feed monitor component 165-1. Again, each XML formatted RSS feed 310-1 . . . 310-N represents web content that contains either a summary of the content or the content itself. Typically, an http server associated with a user's source page (e.g. 110-a shown in FIG. 1B) provides the RSS feed to reader 120-a. Additionally, RSS feeds selected by a user that access content from external web sites may be stored within the user's networking system (e.g. 100-1) or may be stored externally from the user's networking system. The RSS feeds that access content from external web sites in addition to RSS feeds stored within the user's networking system, may still be read by an RSS reader 120-a and monitored by RSS feed monitor component 165-1. The RSS feed monitor component 165-1 determines if each RSS feed contains a link address corresponding to the web site associated with the requested content. Once the RSS feed monitor component 165-1 determines that the link address is contained in the XML formatted RSS feed 310-1 . . . 310-N, the RSS feed monitor component forwards the XML formatted text 320-a for each received RSS feed 310-1 . . . 310-N to the RSS parsing component 165-2.

Figure 4:
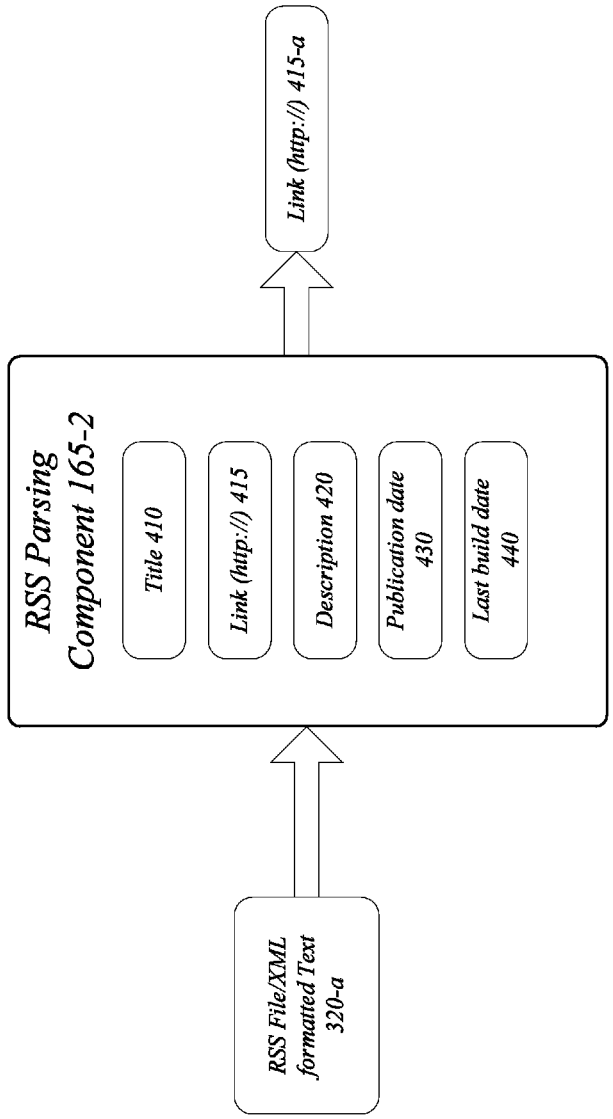
FIG. 4 illustrates an embodiment of an operating environment.

FIG. 4 illustrates an embodiment of an operating environment 400. The operating environment 400 illustrates a more detailed implementation of the RSS parsing component 165-2 of the RSS monitor component 160. As shown in the operating environment 400, the RSS parsing component 165-2 may be arranged to receive, parse and process the XML formatted RSS file 320-a received from RSS feed monitor component 165-1. Generally, RSS content may contain web-based blogs, webpage information, streaming webpage data, streaming RSS data transfer, or the like that contain a full text and/or a summary of content from an associated publisher. Each XML formatted RSS file 320-a may contain, in basic XML schema, a title, description, link information, last build date, publication date, etc. The link information may be an http address of a web site formatted in XML. The RSS parsing component 165-2 parses the RSS feed into various metadata portions including at least the title 410, link address 415, description 430, publication date 430 and last build date 440. The title 410 may include the RSS title if one is available. The link address 415 may be in the form of an http address such as, for example, http://cbsnews.com. In particular, the link address 415 identifies the web page associated with the RSS feed which a user has subscribed to in order to receive updated content on a timely basis. The description information 420 is usually an abridged version summarizing what the web page is about. The publication date 430 may include the date and time the web page was first published or otherwise made available by the content provider. The last build date 440 may identify the date and time the web page was last updated. This metadata may be used to determine available updates to content. In particular, the RSS reader 120-a may compare the last build date 440 to the received data and time from the RSS feed to determine if new content is available for download to the subscriber. RSS parsing component 165-2 extracts the link address 415-a and outputs this information to the RSS identifier component 165-3 for further processing. In this manner, the RSS parsing component 165-2 identifies the web page address subscribed to by a user through the use of the received RSS feed 115-a read by RSS reader 120-a.

Figure 5:
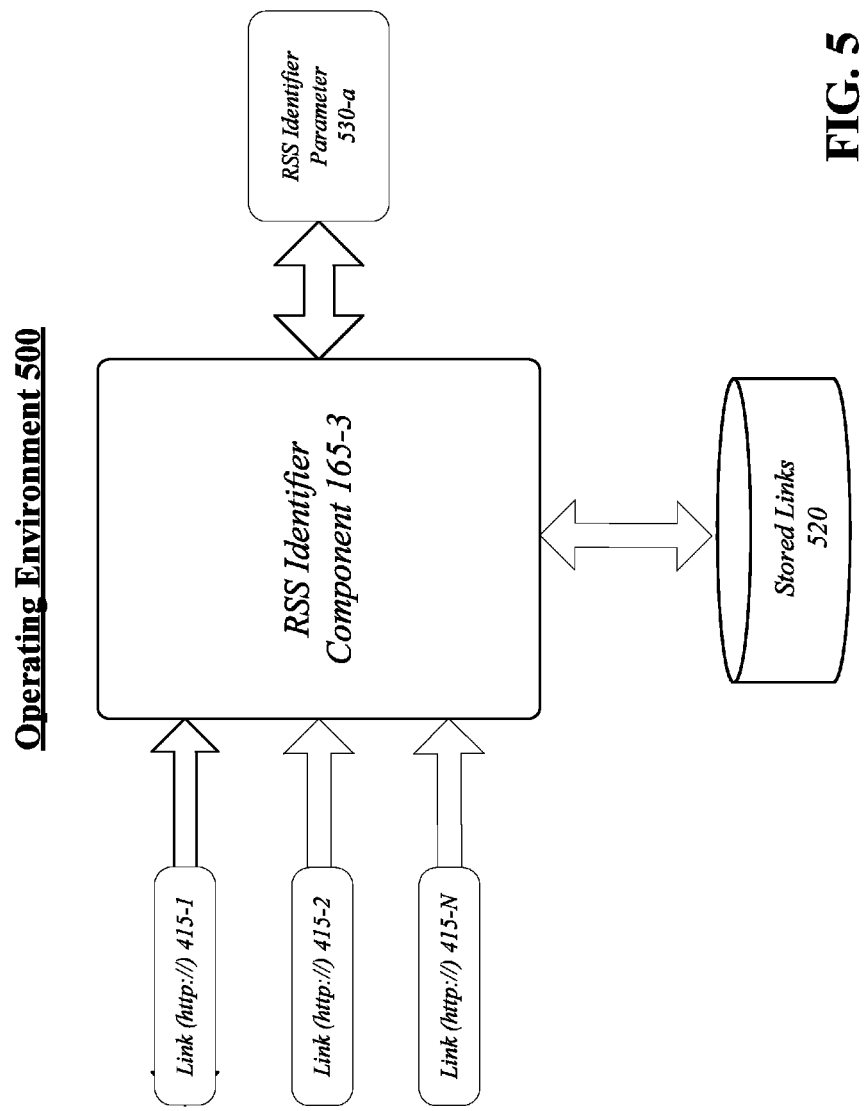
FIG. 5 illustrates an embodiment of an operating environment.

FIG. 5 illustrates an embodiment of an operating environment 500. The operating environment 500 illustrates a more detailed implementation of the RSS identifier component 165-3 of the RSS monitor component 160. As shown in the operating environment 500, the RSS identifier component 165-3 may be arranged to receive the link address identification information 415-1 . . . 415-N from RSS parsing component 165-2. The link address identification information 415-1 . . . 415-N may be associated with a web page, web-based blogs, etc. The RSS identifier component 165-3 compares the received link address identification information 415-1 . . . 415-N with link addresses stored in database 520. The stored link addresses may be associated with particular web pages, web sites, etc., associated with a content provider or publisher in order to determine which content is of particular interest to users or subscribers of the RSS feeds. In other words, the RSS feeds 115-1 . . . 115-N may serve as an indicator of user interest in particular content or data. This trending user interest is determined by extracting the link addresses from the RSS feeds received by the RSS monitor component 160, parsing the link address from the XML formatted RSS feeds by RSS parsing component 165-2 and matching these link addresses to stored links in database 520 associated with one or more content providers or publishers by RSS identifier component 165-3. These stored link addresses may be in any form which indicate the identity of the content provider and in particular, may be associated with a web page, web blog, streaming webpage data, or the like. Once the extracted or parsed link address 415-1 . . . 415-N is compared to the address links stored in database 520, the RSS identifier component 165-3 outputs an RSS identifier parameter 530-a. In particular, RSS identifier parameter 530-a may include the link address 415-1 . . . 415-N from the RSS feed when this link address matches an address stored in database 520 such that in the absence of a link address 415-1 . . . 415-N from the RSS feed indicates that no match was found. Alternatively, the RSS identifier parameter 530-a may be an indicator appended to the link address 415-1 . . . 415-N from the RSS feed to indicate a match with at least one of the link addresses stored in database 520 or to indicate the lack of a match with at least one of the stored link addresses. Regardless of the form the RSS identifier parameter takes, its purpose is to indicate whether or not the RSS feed that includes the link address information 415-1 . . . 415-N received by RSS identifier component 165-3 corresponds to a link address stored in database 520 thereby representing trending user interest for content associated with that link address and that particular content provider. If the stored link address matches the link address received by RSS identifier component 165-3, the associated RSS feeds will be aggregated by RSS aggregator application 170 to determine if and how the associated content will be displayed to a user via various bricks within a screen grid as described below. If the link address received by RSS identifier component 165-3 does not match the stored link address, then the RSS identifier parameter 530-*a* either is not generated by RSS identifier component 165-3 or it is generated, but includes an indicator that no match was found and the RSS aggregator application does not include the RSS feed and consequently the content in determining trending user interest.

Figure 6:
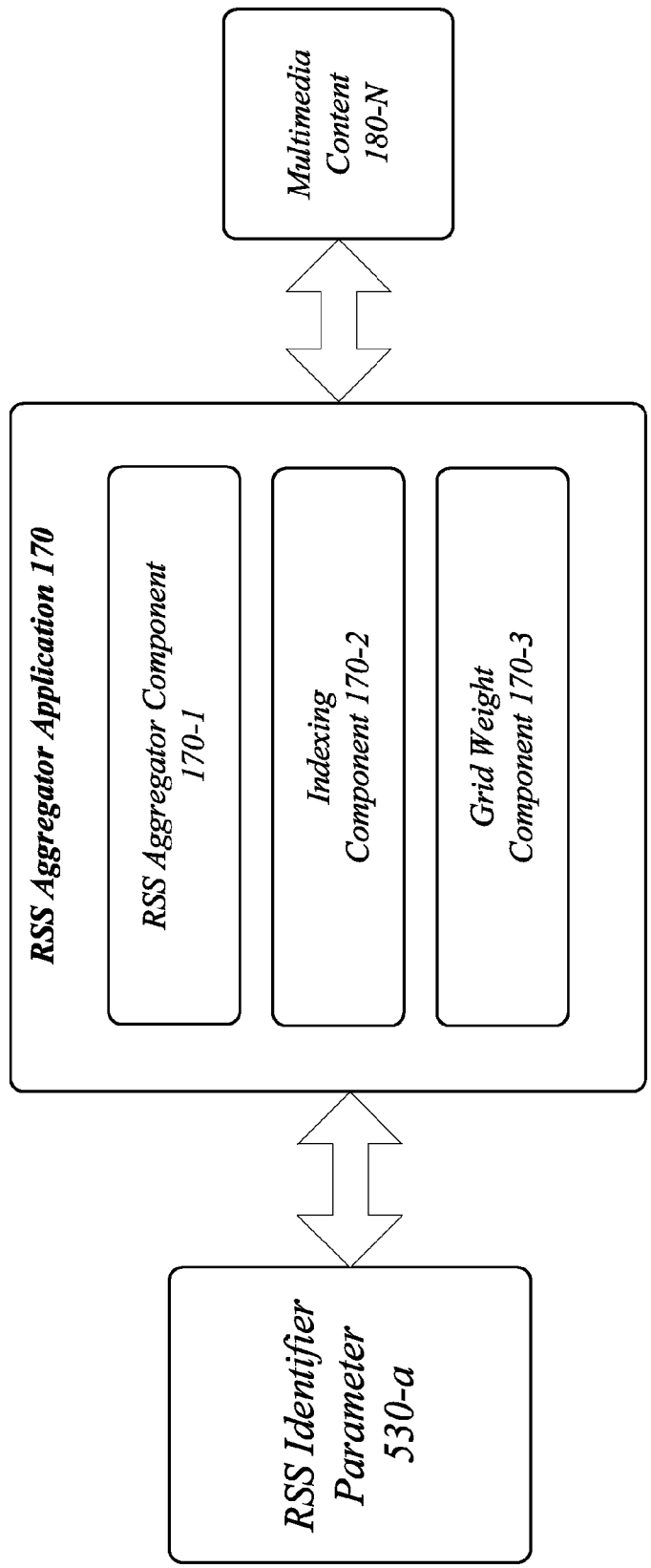
FIG. 6 illustrates an embodiment of an operating environment.

FIG. 6 illustrates an embodiment of an operating environment 600. The operating environment 600 illustrates a more detailed implementation of the RSS aggregator application 170. The RSS aggregator application 170 may be housed within destination web site severs 150-*a* which communicates with the RSS monitor component 160 to receive RSS identifier parameter 530. Alternatively, RSS aggregator application 170 may be supported in a stand-alone environment configured to communicate with RSS monitor component 160 and destination web site servers 150-*a*. As shown in the operating environment 600, the RSS aggregator application 170 is configured to receive the RSS identifier parameters 530 from the RSS monitor component 160 and aggregate the number of RSS identifier parameters associated with particular web sites supported by a content provider to determine trending data to be displayed as multimedia content 180-1 . . . 180-N via destination web site server 150-*a*. In particular, RSS aggregator application 170 includes RSS aggregator component 170-1, indexing component 170-2 and grid weight component 170-3. The RSS aggregator component 170-1 receives the RSS identifier parameters 530-*a* from RSS monitor component 160. As mentioned above, the RSS identifier parameters 530-*a* indicate whether or not a particular link address from an RSS feed matched a saved link address. The RSS aggregator component 170-1 aggregates the received RSS identifier parameters 530-*a* for a given RSS link address 415-*a* and compares the RSS identifier parameters 530-*a* to determine the frequency or level of user interest in the content corresponding to the web site associated with each of the RSS feeds 115-1 . . . 115-N. In other words, the RSS aggregator component 170-1 essentially counts the number of RSS identifier parameters 530-*a* associated with particular link addresses and compares the totals to determine which content is popular among users. This aggregation of the RSS identifier parameters 530-*a* supplied by aggregator component 170-1 is used by indexing component 170-2 and grid weight component 170-3 to determine where and how the trending content is displayed to a user or subscriber. The RSS aggregator component 170-1 outputs a ranking of the web pages corresponding to the aggregated RSS identifier parameters 530-*a* to the indexing component 170-2. This ranking provides the indexing component 170-2 and grid weight component 170-3 with information on where to position the content corresponding to the RSS identifier parameters on the destination web site and what size to allocate to the content within the web page. For example, if the RSS aggregator component 170-1 ranks a video associated with a particular web page address stored in database 520 and identified by the RSS feeds 115-1 . . . 115-N as being the RSS feed saved the most by users within a particular temporal window, then the RSS aggregator component 170-1 will rank that video first among the RSS feeds monitored by RSS monitor component 160. Similarly, if a particular news story is the next most popular story based on the number of RSS feeds 115-1 . . . 115-N selected by users on their source pages 110-1 . . . 110-N, then the RSS aggregator component 170-1 will rank the news story behind the video referenced above. This ranking output will be used to determine where and how this multimedia content (e.g. video and new story) will be displayed on the destination web site server 150-*a*. In particular, the indexing component 170-2 receives the aggregated RSS identifier parameters 520-*a* from RSS aggregator component 170-1 and determines the position of the content associated with the link address of the RSS identifier parameter 530-*a* on a web page based on the ranking information which is also received from the RSS aggregator component 170-1. The grid weight component 170-3 determines the size on the web page allocated to the particular content based on the ranking of the RSS identifiers 520-*a*. Thus, the indexing component 170-2 determines the position of the multimedia content 180-N retrieved from a link address and the grid weight component 170-3 determines the size allocated to that multimedia content 180-N. Once the multimedia content 180-N is built using the indexing component 170-2 and grid weight component 170-3, then various formatting techniques may be employed to present the multimedia content to the user. For example, CSS (Cascading Style Sheets) may be used to provide presentation semantics for the multimedia content 180-N written in HTML and XHTML including layout, colors, fonts, etc. CSS does not affect the substance of the multimedia content 180-N, but rather provides the ability to format the content on the webpage.

In one exemplary use scenario, if the RSS identifier parameter 530-*a* corresponds to a link address for a particular story (e.g. Summer Olympics) on a web site (e.g. www.cbssports.com), then the RSS aggregator component 170 determines the level of trending user interest for this sports topic based on the frequency of RSS feeds associated with this link address. This trending user interest may be defined within a given time period. Alternatively, the RSS identifier component 530-*a* may represent a particular event within the Summer Olympic games that seems to have peaked user interest as evidenced by the number of RSS feeds for this story as monitored by RSS monitor component 160. The RSS aggregator 170-1 determines, based on the number of RSS feeds represented by the RSS identifier parameter, that this particular event within the Summer Olympics demonstrates user interest for a given time frame. Thus, the indexing component may position this content in the center of the corresponding web page (e.g. www.cbssports/olympics) and the grid weight component 170-3 determines the size and look of that content on the webpage. In this manner, a web page may be built with a plurality of bricks, where each brick may represent multimedia content associated with one or more topics of user interest and the size of each brick is determined by the weight assigned to the particular multimedia content.

Figure 7:
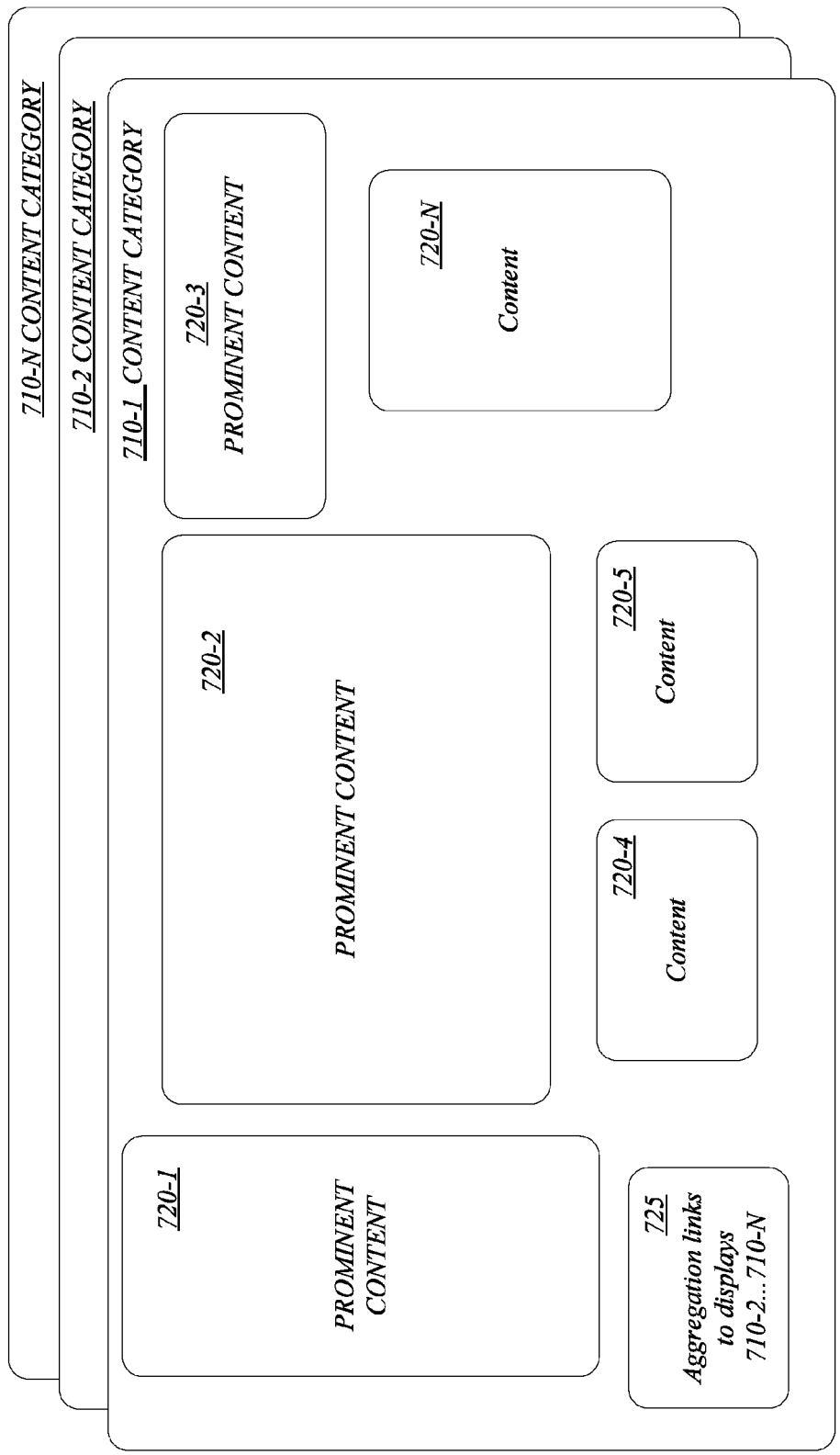
FIG. 7 illustrates an exemplary user interface view illustrating exemplary multimedia content based on an aggregation technique.

FIG. 7 illustrates an exemplary embodiment of a web page 700 utilizing the RSS aggregator application 170 shown in FIG. 6. The web page 700 may be formatted in HTML or XHTML (Extensible HyperText Markup Language) and may be a static web page where the content is stored with a web server associated with a destination web site (e.g. 150-*a* shown in FIG. 1B) or may be a dynamic web page which is constructed by software on the server supporting the destination web site. The web page 700 may include thumbnails 710-1 . . . 710-N where each thumbnail may be associated with a particular content category based on trending multimedia information. For example, content category 710-1 may be associated with news information, content category 710-2 may be associated with fantasy sports information, and content category 720-N may be associated with computer technology topics, and so on. Each content category further includes a plurality of bricks 720-1 . . . 720-N arranged according to its index and weight as determined by indexing component 170-2 and grid weight component 170-3. It may be appreciated that more or less bricks 720-1 . . . 720-N may be used for a given content category implementation depending on the topic and the number of RSS feeds monitored by RSS monitor component 160 and aggregated by RSS aggregator application 170. The embodiments are not limited in this context. Each brick may be a portion or abridged version of multimedia content. For example, in content category 710-1 the multimedia content contained in brick 720-2 may be prominent content which corresponds to the greatest number of RSS feeds within a given time frame and given topic and may contain a picture and text associated with a particular trending topic or story. Thus, brick 720-2 is positioned by indexing component 170-2 in the middle of content category 710-1 and grid weight component 170-3 assigns a size to the brick 720-2 since it is prominent content as compared to the remaining bricks 720-4 . . . 720-N. It should be noted that indexing component 170-2 and grid weight component 170-3 control the position and size of each of the bricks 720-1 . . . 720-N. However, the position and size of each brick 720-1 . . . 720-N as well as the formation of each content category 710-1 . . . 710-N may be determined by the trending user interest as evidenced by the frequency of RSS feeds monitored by RSS monitor component 160 as described above. In other words, the weight given multimedia content displayed in each brick 720-1 . . . 720-N is representative of its importance as determined by the trending user interest. Alternative methods may also be used to determine the formation of the content categories 710-1 . . . 710-N instead of by trending user content. For example, alternative methods may be used to determine content categories based on, the most recent trending user interest, a velocity parameter, and/or followings from particular social networks, etc. Thus, in the exemplary embodiment of web page 700, brick 720-2 has the greatest weight and contains the multimedia content that is most popular or demonstrates the greatest trending user interest within a given timeframe. The indexing of bricks 720-1 and 720-3 may also be associated with prominent content based on the number of RSS feeds monitored by RSS monitor component 160 and aggregated by RSS aggregator application 170. The indexing of the multimedia content contained in the remaining bricks 720-3 . . . 720-N are not as popular as the multimedia content contained in bricks 720-1, 720-2 and 720-3. However, the multimedia content contained in brick 720-1 has a higher trending user interest than the multimedia content contained in brick 720-3 which has a higher trending user interest than the multimedia content contained in brick 720-N and so on. In this manner, content category 710-1 is built using aggregated RSS feed information to determine trending user interest and multimedia content associated with that trending user interest populates each of the bricks 720-1 . . . 720-N. It should be noted that the illustration of bricks 720-1 . . . 720-N is exemplary and the size and position of each brick within the content categories 710-1 that defines web page 700 is dependent on the aggregated RSS feeds as described above and may take alternative configurations. In addition, one or more of the bricks 720-1 . . . 720-N may be populated with advertisements associated with or relevant to the multimedia content contained on a particular content category. The frequency by which the content categories 710-1 . . . 710-N are built and the corresponding bricks 720-1 . . . 720-N are updated, changed and/or reconfigured with multimedia content may be defined by the number of RSS feeds received within a given time period. Brick 725 may contain an aggregation of links to the various content categories 710-1 . . . 710-N and/or to the various multimedia information contained in each of the bricks 720-1 . . . 720-N for each content category. As described above, each of the bricks may be an abridged version of a trending story. Thus, brick 725 may contain a listing of links to each of the full versions of the stories or multimedia information (e.g. videos, photos, etc.) contained in each of the bricks 720-1 . . . 720-N or to each of the bricks contained in each of the content categories 710-1 . . . 710-N. In this manner, a user has the ability to access individual links for multimedia content associated with each of the bricks 720-1 . . . 720-N on a particular content category 710-1 . . . 710-N.

Included herein is a set of flow charts representative of exemplary methodologies for performing novel aspects of the disclosed system. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 8:
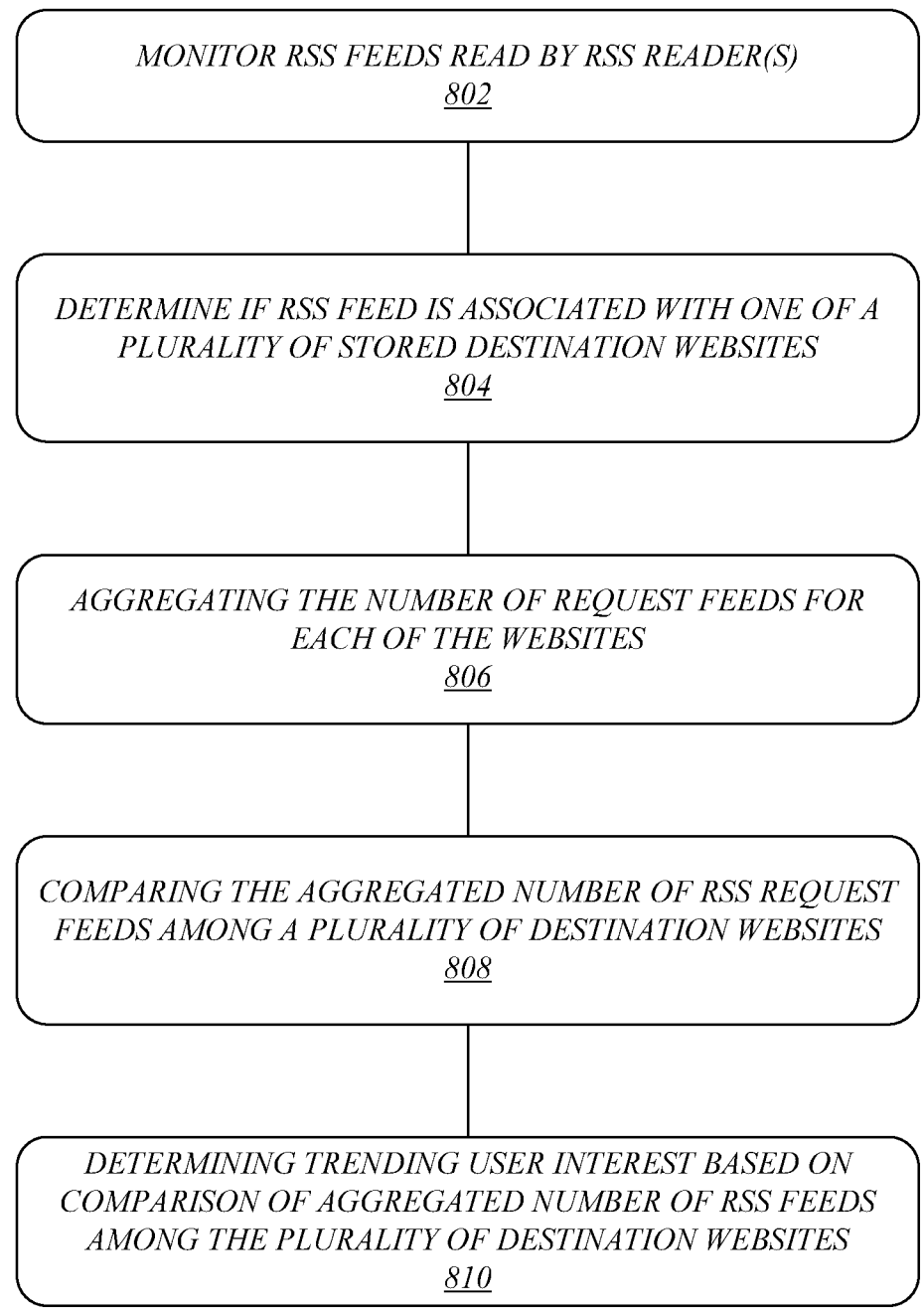
FIG. 8 illustrates an embodiment of a logic flow.

FIG. 8 illustrates one embodiment of a logic flow 800. The logic flow 800 may be representative of some or all of the operations executed by one or more embodiments described herein. In the illustrated embodiment shown in FIG. 8, the logic flow 800 may monitor RSS feeds at block 802. For example, RSS monitor component 160 communicates with RSS readers 120-1 . . . 120-N to monitor RSS feeds 115-1 . . . 115-N received by the RSS readers associated with particular destination web sites. The RSS monitor component may be part of a destination or content provider web site server 150-*a* or may be a separate interface disposed between the RSS readers 120-*a* and the content provider. The logic flow 800 determines if the RSS feed is associated with one of a plurality of destination web sites at block 804. For example, RSS feeds 115-1 . . . 115-N read by the appropriate reader 120-1 . . . 120-N are monitored by RSS monitor component 160 to determine if a feed is associated with one or more particular destination web sites or web pages on destination web site servers 150-*a* maintained by a content provider. RSS monitor component 160 parses each of the received RSS feeds to identify the link address contained in the RSS feed 115-1 . . . 115-N. The RSS monitor component 160 compares the link address information with one or more of a plurality of destination sources stored on web site servers 150-*a* associated with particular saved link addresses. If the link address parsed from the RSS feed 115-1 . . . 115-N matches a link stored in database 520, then the address information is passed to RSS aggregator application 170. The logic flow 800 aggregates the number of request feeds for each of the associated web sites at block 806. For example, the RSS aggregator application 170 is configured to receive the RSS identifier parameter from the RSS monitor component 160 and, based on the number and source of the RSS feeds 115-1 . . . 115-N, determines trending data to be displayed as multimedia content 180-1 . . . 180-N via destination web site servers 150-*a*. In particular, the link information associated with the RSS feeds 115-1 . . . 115-N is extracted and identified by RSS monitor component 160 and then aggregated by RSS aggregator application 170 to determine the number of RSS feeds 115-1 . . . 115-N that correspond to a particular web site to determine trending interest by users. In addition, the RSS feeds 115-1 . . . 115-N monitored by RSS monitor component 160 may be analyzed within temporal parameters. Based on the volume of these RSS feeds, trending data may be determined and multimedia content associated with the trending data may be displayed.

The logic flow 800 compares the aggregated request feeds among a plurality of destination web sites at block 808. For example, RSS aggregator component 170-1 aggregates the received RSS identifier parameters 530-*a* for a given RSS link address 415-*a* and compares these RSS identifier parameters to determine which of the destination web pages or web sites stored on destination web servers 150-*a*, represented by the number of RSS feeds 115-*a* . . . 115-N are being subscribed to by users. The logic flow 800 determines trending user interest based on the comparison of the aggregated RSS feeds among the plurality of destination web sites at block 810. For example RSS aggregator component 170-1 determines the frequency or level of trending user interest in the content corresponding to the web site associated with each of the RSS feeds 115-1 . . . 115-N. In other words, the RSS aggregator component 170-1 essentially counts the number of RSS identifier parameters 530-*a* associated with particular link addresses and compares the totals to determine which content is popular among users.

Figure 8A:
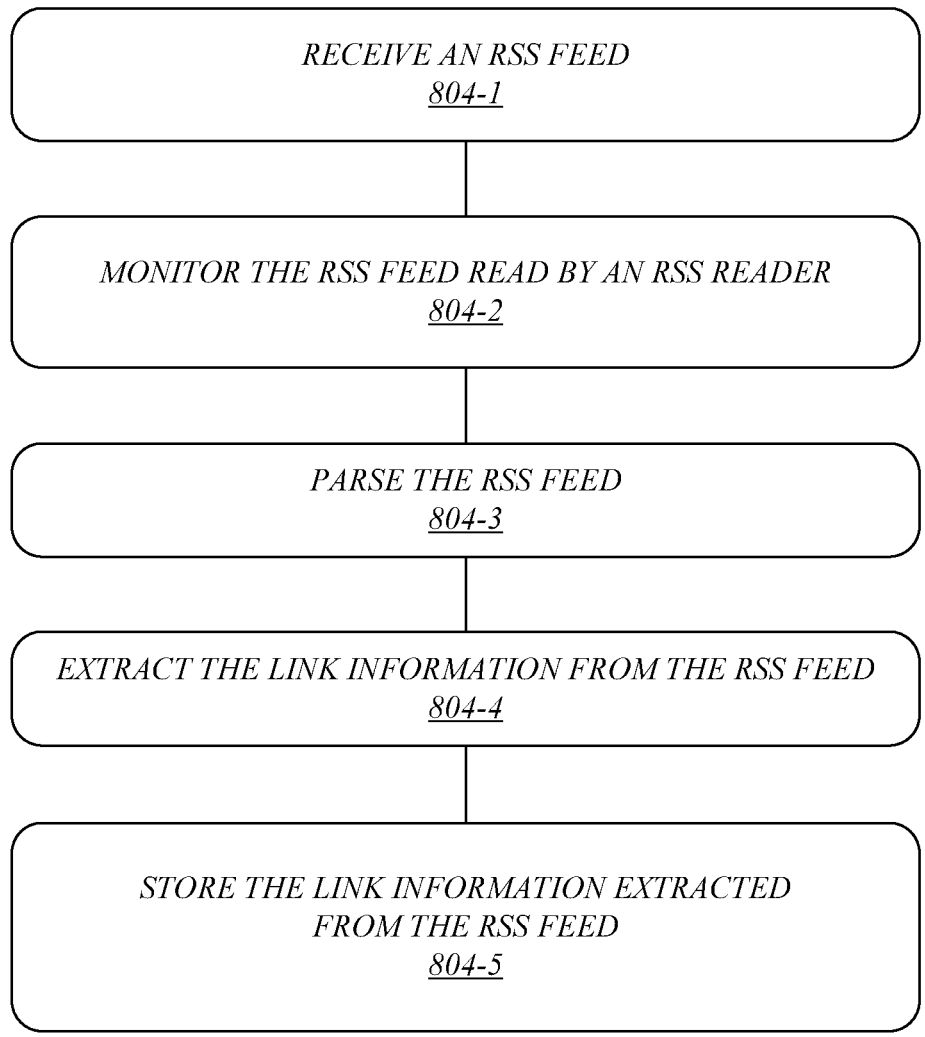
FIG. 8A illustrates an embodiment of a logic flow.

FIG. 8A illustrates a more detailed logic flow of block 804 shown in FIG. 8 executed by, for example, RSS monitor component 160. The logic flow 804 may be representative of some or all of the operations executed by one or more embodiments described herein. In the illustrated embodiment shown in FIG. 8A, the logic flow 804 receives an RSS feed over an RSS link at block 804-1. For example, communication links 130-1 . . . 130-N may be configured between the user source pages 110-1 . . . 110-N and an RSS reader 120-1. Links 130-1 . . . 130-N may be physical or logical links between the networking system 100-1 and the RSS reader 120-1. Each of the RSS links 130-1 . . . 130-N is configured to accommodate RSS feeds 115-1 . . . 115-N. A user may subscribe to a particular RSS feed 115-1 . . . 115-N which is read by RSS reader 120-1 received via link 130-1 . . . 130-N. The RSS reader 120-1 polls the respective RSS feed 115-1 . . . 115-N subscribed to by a user for new content. The RSS readers 115-1 . . . 151-N may check the user's subscribed feeds regularly for new content. When updates to the content are available, the content is downloaded with the RSS feed 115-1 . . . 115-N. The logic flow 804 monitors the RSS feed read by an RSS reader at block 804-2. For example, RSS feed monitor 165-1 of the RSS monitor component 160 is used to monitor RSS feeds 115-1 . . . 115-N received by an RSS reader (e.g. 120-*a*). Each RSS feed that is read by an RSS reader 120-*a* is also monitored by RSS feed monitor component 165-1. The XML formatted RSS feeds 310-1 . . . 310-N are extracted by RSS monitor component 160 and provided to RSS feed monitor component 165-1. The RSS feed monitor component 165-1 may also determines if each RSS feed contains the necessary link address corresponding to the web site associated with the requested content. The logic flow 804 parses the RSS feed at block 804-3. For example, an RSS parsing component 165-2 within RSS monitor component 160 is configured to parse and process the XML formatted RSS file 320-*a* received from RSS feed monitor component 165-1. The RSS file 320-*a* may be an XML formatted file that contains, in basic XML schema, a title, description, link information, last build date, publication date, etc. The link information may be an http address of a web site formatted in XML. The RSS parsing component 165-2 parses the RSS feed into various metadata portions including at least the title 410, link address 415, description 430, publication date 430 and last build date 440. The link address 415 may be in the form of an http address. In particular, the link address 415 identifies the web page associated with the RSS feed which a user has subscribed to in order to receive updated content as made available by the content provider. The logic flow 804 extracts the link information from the RSS feed at block 804-4. In addition to parsing the RSS feed at block 804-3, the RSS parsing component 165-2 may extract the link information from the RSS feed to make it available to the RSS identifier component 165-3 which compares the received link address with particular link addresses stored in database 520. The link address information extracted by the RSS parsing component 165-2 may be temporarily stored at block 804-5 in a volatile or non-volatile memory device for later comparison to link addresses stored in database 520.

Figure 8B:
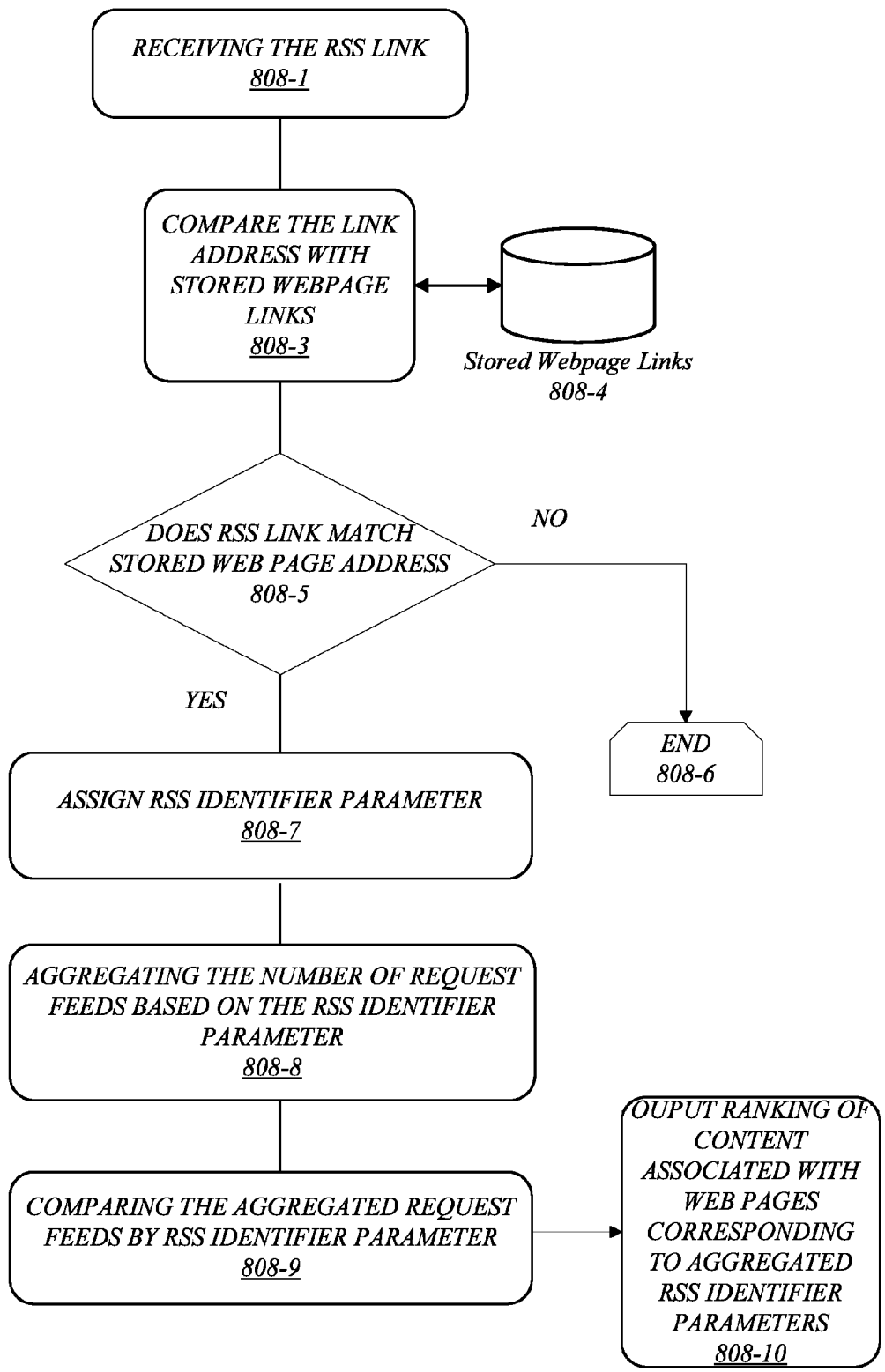
FIG. 8B illustrates an embodiment of a logic flow.

FIG. 8B illustrates a more detailed logic flow of blocks 808-810 shown in FIG. 8 executed by, for example, RSS monitor component 160 and RSS aggregator application 170. The logic flow may be representative of some or all of the operations executed by one or more embodiments described herein. In the illustrated embodiment shown in FIG. 8B, the logic flow receives the RSS link information at block 808-1. For example, the RSS identifier component 165-3 of RSS monitor component 160 may be arranged to receive the link address identification information 415-1 . . . 415-N from RSS parsing component 165-2. The link address identification information 415-1 . . . 415-N may be associated with a web page, web-based blogs, etc. The link address information is compared, at block 808-3, with the stored web page links provided at block 808-4. For example, the RSS identifier component 165-3 compares the received link address identification information 415-1 . . . 415-N with link addresses stored in database 520. The stored link addresses may be associated with particular web pages, web sites, etc., associated with a content provider or publisher in order to determine which content is of particular interest to users or subscribers of the RSS feeds. In other words, the RSS feeds 115-1 . . . 115-N may serve as an indicator of user interest in particular content or data. These stored link addresses may be in any form which indicate the identity of the content provider and in particular, may be associated with a web page, web blog, streaming webpage data, or the like. A determination is made at block 808-5 whether or not the RSS links extracted from the RSS feeds match one of a plurality of stored web page addresses associated with a content provider at block 808-5. If the extracted or parsed link address does not match the stored web page address, then the logic flow ends at 808-6. If the extracted or parsed link address from the RSS feeds match a stored web page address then the logic flow proceeds to block 808-7 where an RSS identifier parameter is assigned to indicate that a match occurred. For example, the RSS identifier component 165-3 outputs an RSS identifier parameter 530-*a* which may include the link address 415-1 . . . 415-N from the RSS feed when this link address matches an address stored in database 520 such that in the absence of a link address 415-1 . . . 415-N from the RSS feed indicates that no match was found. Alternatively, the RSS identifier parameter 530-*a* may be an indicator appended to the link address 415-1 . . . 415-N from the RSS feed to indicate a match with at least one of the link addresses stored in database 520. Again the purpose of the RSS identifier parameter is to indicate whether or not the RSS feed that includes the link address information 415-1 . . . 415-N received by RSS identifier component 165-3 corresponds to a link address stored in database 520 thereby representing trending user interest for content associated with that link address and that particular content provider. The request feeds based on the RSS identifier parameter are aggregated at block 808-8. For example, the RSS aggregator application 170 is configured to receive the RSS identifier parameters 530 from the RSS monitor component 160 and aggregate the number of RSS identifier parameters associated with particular web sites supported by a content provider to determine trending data to be displayed as multimedia content 180-1 . . . 180-N via destination web site servers 150-*a*. The aggregated request feeds are compared based on the assigned RSS identifier parameter at block 808-9. For example, the RSS aggregator component 170-1 essentially counts the number of RSS identifier parameters 530-*a* associated with particular link addresses and compares the totals to determine which content is trending among users that selected these RSS feeds. The logic flow outputs a ranking of content associated with the web pages corresponding to the aggregated RSS identifier parameters at block 808-10. For example, the RSS aggregator component 170-1 outputs a ranking of the web pages corresponding to the aggregated RSS identifier parameters 530-*a* to the indexing component 170-2. This ranking provides the indexing component 170-2 and grid weight component 170-3 with information on where to position the content corresponding to the RSS identifier parameters on the destination web site servers 150-*a* and what size to allocate to the content within the web page.

Figure 8C:
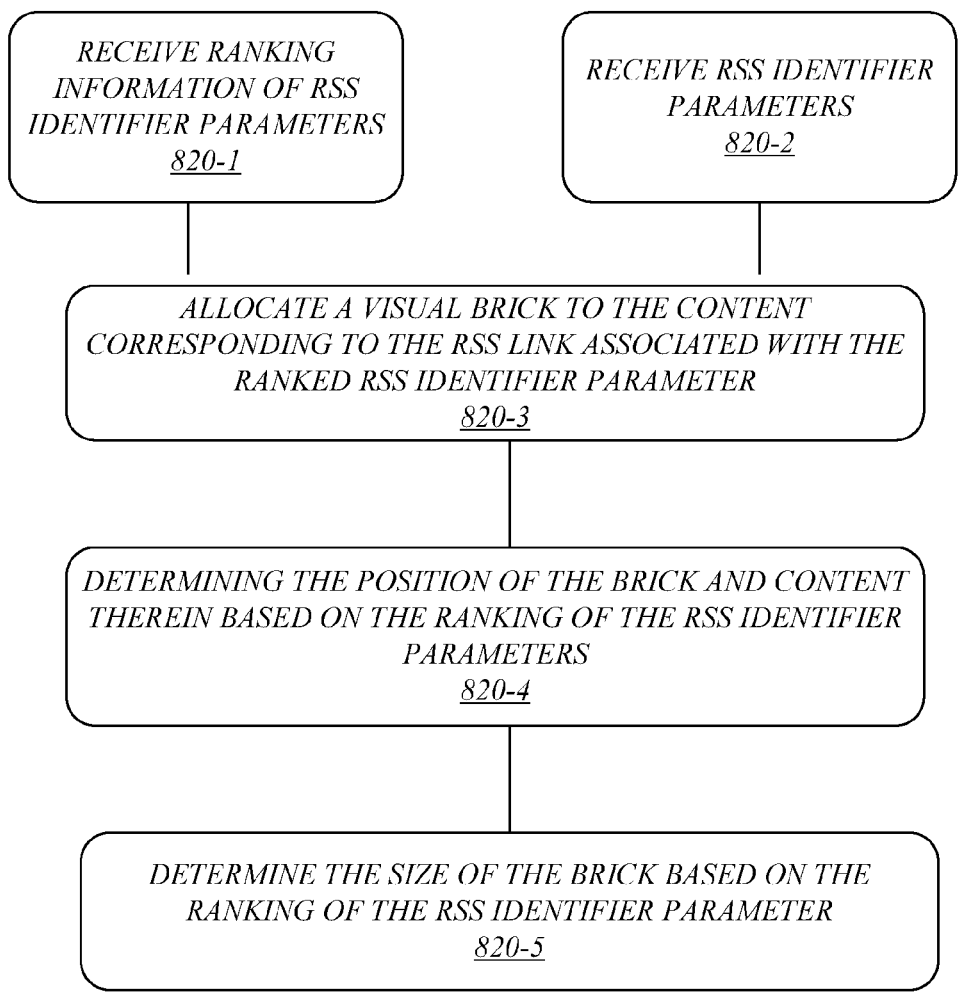
FIG. 8C illustrates an embodiment of a logic flow.

FIG. 8C illustrates a logic flow 820 to of how and where content associated with the RSS identifier parameters is displayed on destination web site stored on destination web site servers 150-*a*. The logic flow may be representative of some or all of the operations executed by one or more embodiments described herein. In the illustrated embodiment shown in FIG. 8C, the logic flow 820 receives the ranking information of the RSS identifier parameters at block 820-1 and the corresponding RSS identifier parameter at block 820-2. For example, the RSS aggregator component 170-1 outputs a ranking of the web pages corresponding to the aggregated RSS identifier parameters 530-*a* to the indexing component 170-2. A brick which defines an area on the destination web page into which the ranked content is disposed is allocated to the ranked RSS identifier parameter and consequently the content associated with the RSS link assigned to the RSS identifier parameter at block 820-3. A determination is made by the logic flow 820 at block 820-4 to position the brick and consequently the content on the web page based on the ranking of the RSS identifier parameters. For example, the indexing component 170-2 receives the aggregated RSS identifier parameters 520-*a* from RSS aggregator component 170-1 and determines the position of the content associated with the link address of the RSS identifier parameter 530-*a* on a web page based on the ranking information which is also received from the RSS aggregator component 170-1. The logic flow 820 determines the size of the brick based on the ranking of the RSS identifier parameter at block 820-5. For example, the grid weight component 170-3 determines the size on the web page allocated to the particular content based on the ranking of the RSS identifiers 520-*a*. Thus, the indexing component 170-2 determines the position of the multimedia content 180-N retrieved from a link address and the grid weight component 170-3 determines the size allocated to that multimedia content 180-N.

Figure 9:
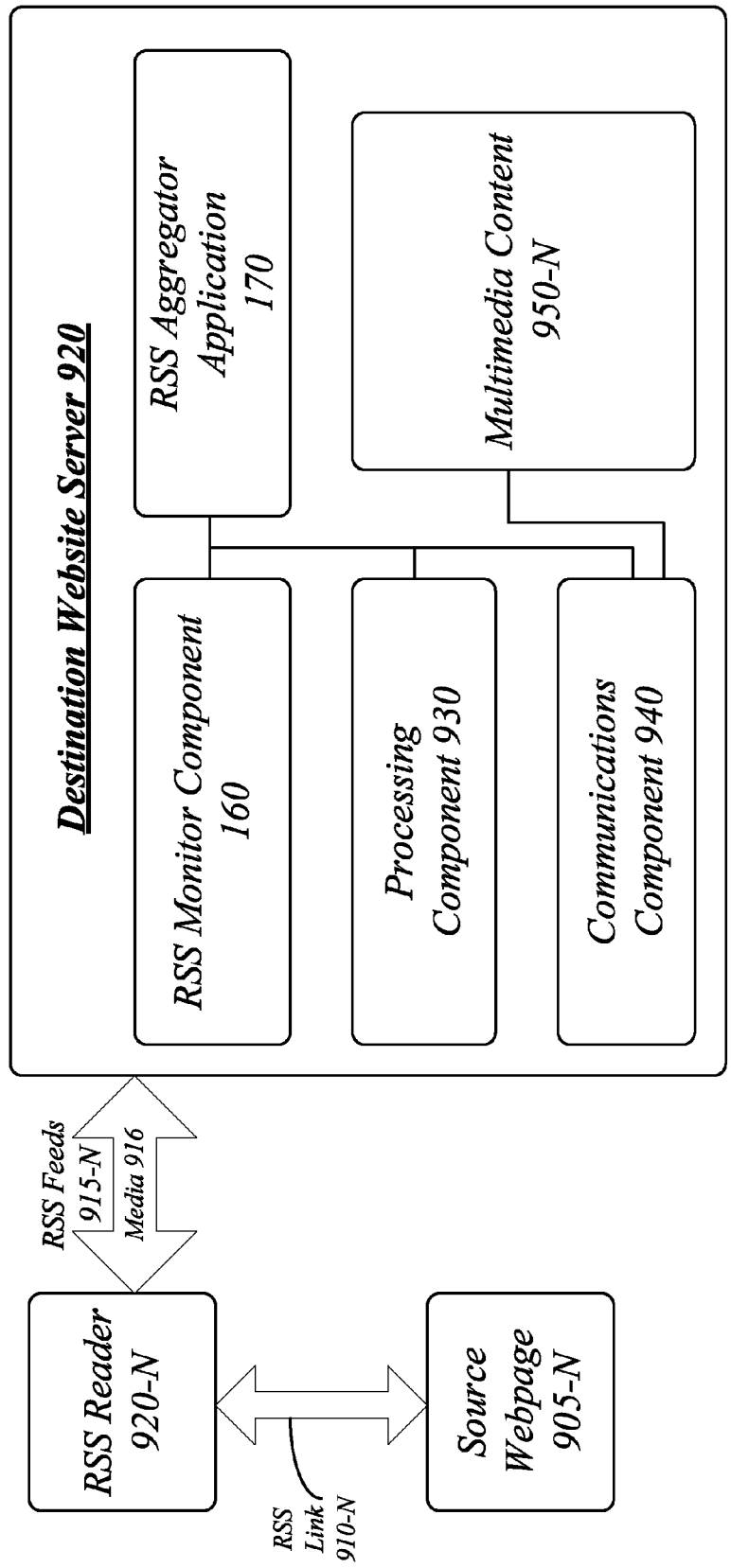
FIG. 9 illustrates an embodiment of a centralized system for the multimedia aggregation system of FIG. 1B.

FIG. 9 illustrates a block diagram of a centralized system 900. The centralized system 900 may implement some or all of the structure and/or operations for an RSS aggregation system which polls RSS feeds to determine trending content based on link information contained within the RSS feeds in a single computing entity, such as entirely within a single device. For example, the RSS aggregation system 100 may be implemented on a destination web site server 920 accessible via different communications systems and networks. The destination web site server 920 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The destination web site server 920 may execute processing operations or logic for the system 100 using a processing component 930. The processing operations required for the RSS monitor component 160, the RSS aggregator application 170, communications component 940 and web page generation with multimedia content 950-N may be shared with processing component 930. The processing component 930 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The destination web site server 920 may execute communications operations or logic for the system 100 using communications component 940. The communications component 640 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 940 may include various types of standard communication elements, such as one or more communications interfaces, network interfaces, network interface cards (NIC), radios, wireless transmitters/receivers (transceivers), wired and/or wireless communication media, physical connectors, and so forth. The RSS reader 920-N may communicate with destination web site server 920 and one or more source web pages 905-N over a communications media 916 using communications signals in the form of RSS feeds 915-N, via the communications component 940. The user source web pages 905-N may communicate with RSS readers 920-N via RSS links 910-N. The user web pages 905-N are maintained and accessed by servers separate from destination web site server 920 and RSS readers 920-N.

The destination web site server 920 may comprise part of an overall communications system or network capable of communicating information between the RSS monitor component 160 and RSS aggregator application 170. In particular, the destination web site server 920 may be a centralized server to manage the aggregation of RSS feeds 915-N received by RSS reader 920-N. The RSS monitor component 160 and RSS aggregation application 170 may be integral to the destination web site server 920 in that the processing component 930 may be shared with the RSS monitor component 160 and that the RSS aggregation application may run on the processing component 930. In various embodiments, the source web pages 905-N may be accessed using various client devices implemented as a mobile device having both computing and communications capabilities, such as a notebook computer, a handheld computer, a smart phone, a tablet computer, a remote control, a smart remote control, and so forth. The client device used to access source web pages 905-N may also comprise or be implemented as a fixed device having both computing and communications capabilities, such as a desktop computer, workstation, digital television, smart television, set top box (STB) or digital media transceiver, audio/video (AV) receiver, consumer appliance, a game system, and so forth. When a user subscribes to an RSS feed via a source web page 905-N, for example, a corresponding RSS feed is sent over RSS link 910-N and read be RSS reader 920-N. A user of source page 905-N may subscribe to a particular RSS feed 915-N by clicking an RSS icon in a web-browser, for example. The RSS icon is associated with an application that initiates the subscription process to a particular webpage corresponding to the RSS feed. RSS reader 920-1 reads each of the RSS feeds 915-N received via RSS link 910-N and polls the respective RSS feed subscribed to by a user for new content. The RSS readers 920-N may check the user's subscribed feeds regularly for new content. When updates to the content are available, the content is downloaded with the RSS feed 915-N. The RSS monitor component 160 communicates with RSS readers 920-N via media 916 and monitors the RSS feeds 915-N received by the RSS readers associated with particular destination web sites. The RSS aggregator application 930 communicates with the RSS monitor component 160 and may run on processing component 930 and utilize communications component 940. The RSS aggregator application 930 is configured to receive the identification information from the RSS monitor component 160 and, based on the amount of RSS feeds and the link address information contained in the RSS feeds 915-N, determines trending data to be displayed as multimedia content 950-N by destination web site server 920.

Figure 10:
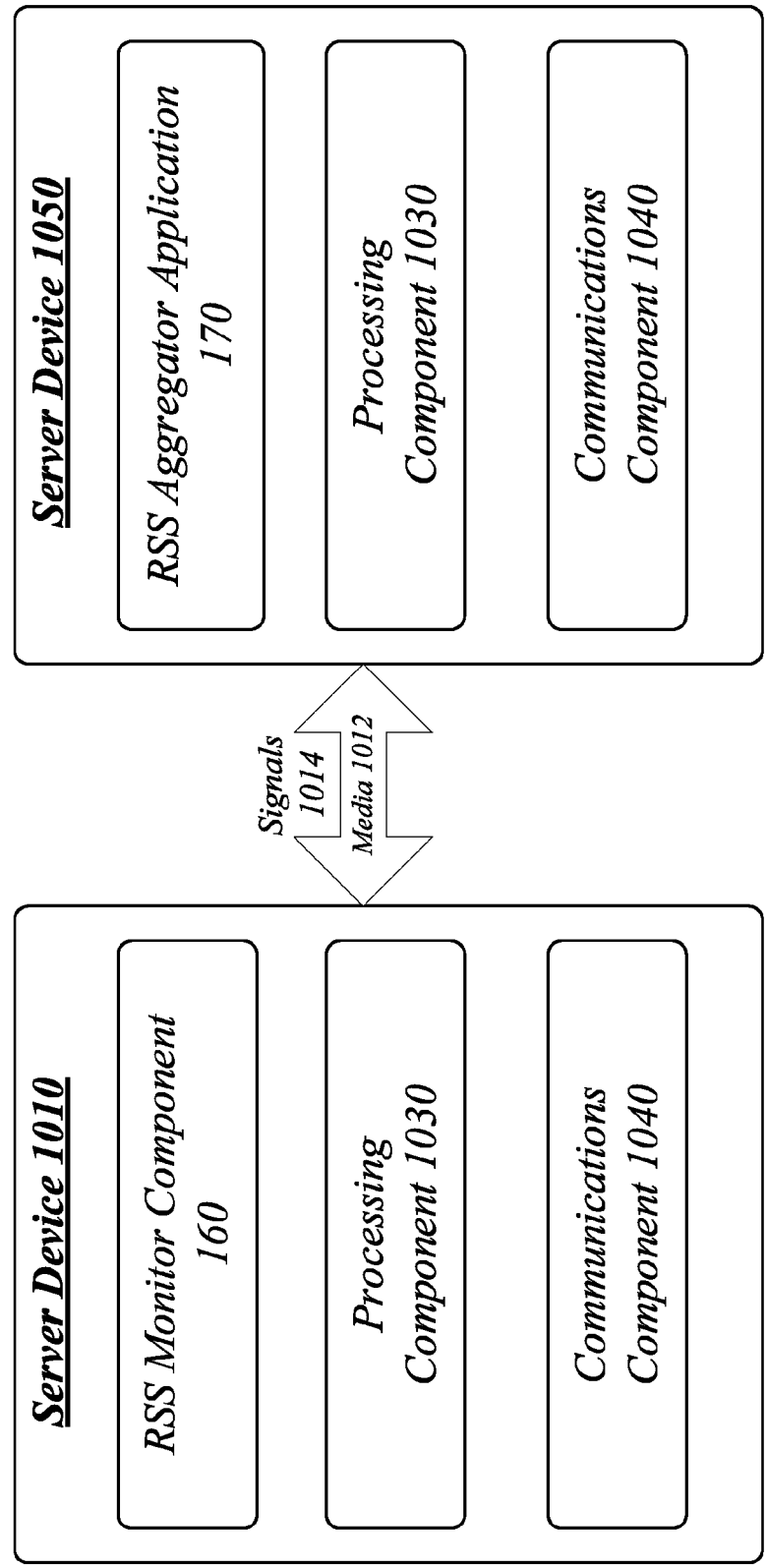
FIG. 10 illustrates an embodiment of a distributed system for the multimedia aggregation system of FIG. 1B.

FIG. 10 illustrates a block diagram of a distributed system 1000. The distributed system 1000 may distribute portions of the structure and/or operations for the RSS aggregation system 100 across multiple computing entities. Examples of distributed system 1000 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1000 may comprise a first server device 1010 and a second server device 1050. In general, the client device 1010 and the server device 1050 may be the same or similar to the destination web site server 150-a as described with reference to FIGS. 1B and 1C. For instance, the server device 1010 and the server device 1050 may each comprise a processing component 1030 and a communications component 1040 which are the same or similar to the processing component 930 and the communications component 940, respectively, as described with reference to FIG. 9. In another example, the devices 1010, 1050 may communicate over a communications media 1012 using communications signals 1014 via the communications components 1040.

The server device 1010 may comprise or employ one or more programs that operate to perform various methodologies in accordance with the described embodiments. In one embodiment, for example, the server device 1010 may implement a the RSS monitor component 160. The RSS monitor component may comprise an application residing on the server device 1010 that is arranged to interoperate with the RSS aggregator application 170 implemented by the server device 1050. The RSS monitor component 160 and the RSS aggregator application 170 may also provide a particular schema to format, render and present multimedia content information 950-N based on the monitoring, processing and aggregation of RSS feeds 915-N via media 1012 using signals 1014. The server device 1010 may further implement a web browser 1015. In one embodiment, the server device 1010 may communicate with server device 1050 using a software architecture designed to support interoperable machine-to-machine interaction over a media 1012 using signals 1014. In particular, the server devices 1010 and 1050 may implement various web technologies, including remote procedure call (RPC) based technologies, simple object access protocol (SOAP) based technologies, service-oriented architecture (SOA) based technologies, or representational state transfer (REST) based technologies, among others to communicate information between the RSS monitor component 160 and RSS aggregator application 170. Generally, SOAP is a protocol specification for exchanging structured information to implement web services over a computer network. SOAP relies on extensible markup language (XML) as a message format. SOAP also relies on other application layer protocols, such as RPC and hypertext transfer protocol (HTTP), for message negotiation and transmission. In this manner, server device 1010 may be configured to RSS identifier parameters 530-a to server device 1050 for processing by RSS aggregation application 170.

The server devices 1010 and 1050 may comprise or employ one or more server programs that operate to perform various methodologies in accordance with the described embodiments. In one embodiment, for example, the server device 1050 may implement some or all of the features of system 100 and the communications components 1040 may be used to provide parameters between the RSS monitor component 160 of server device 1010 to RSS aggregator application 170 on the server device 1050.

Figure 11:
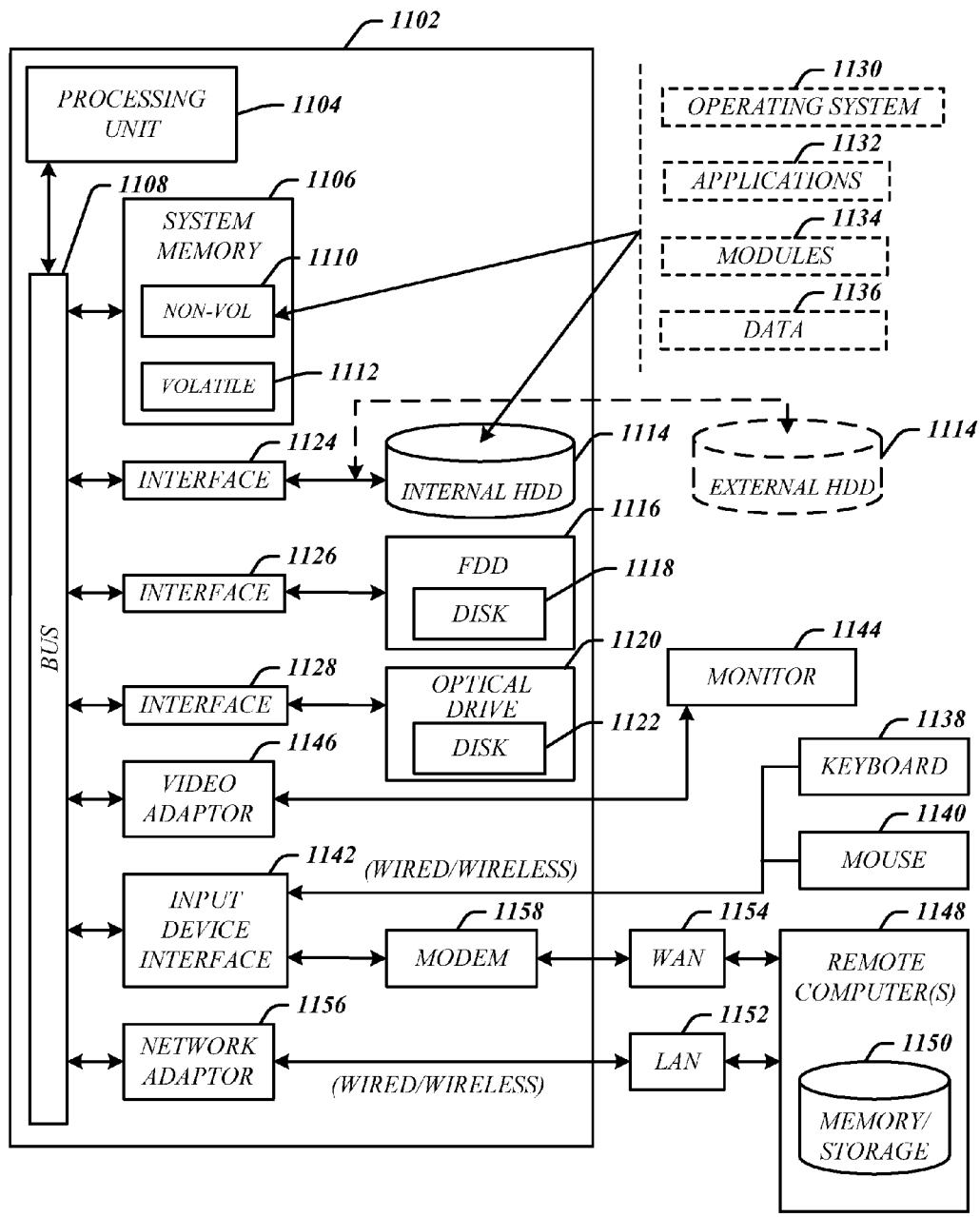
FIG. 11 illustrates an embodiment of a computing architecture.

FIG. 11 illustrates an embodiment of an exemplary computing architecture 1100 suitable for implementing various embodiments of the RSS aggregation system 100 as previously described. In one embodiment, the computing architecture 1100 may comprise or be implemented as part of an electronic device. Examples of an electronic device may include those described with reference to FIGS. 9 and 10, among others. The embodiments are not limited in this context. As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces. The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1104.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies. The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of the system 100.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth. The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156. When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
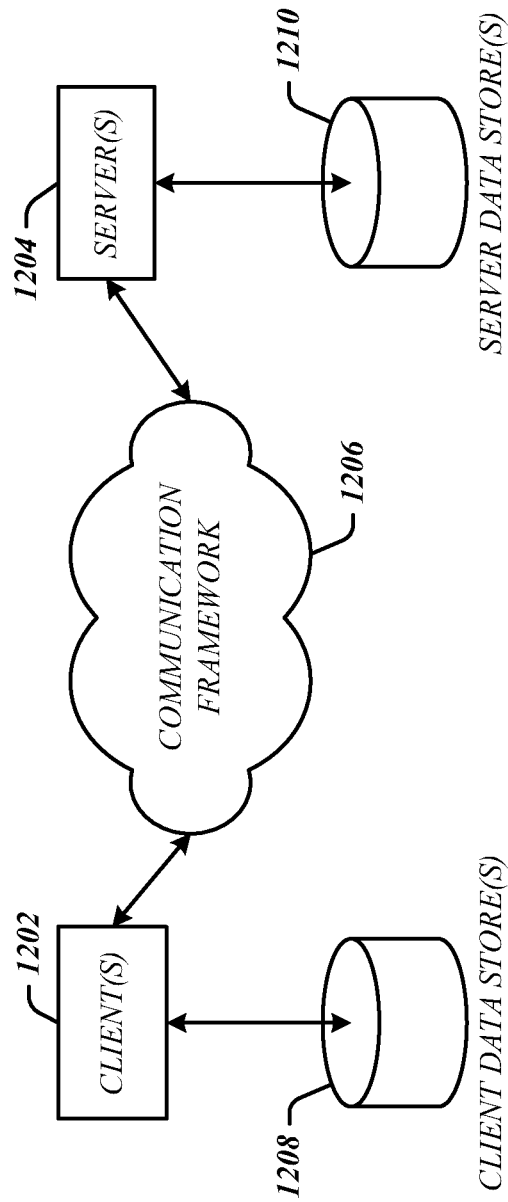
FIG. 12 illustrates an embodiment of a communications architecture.

FIG. 12 illustrates a block diagram of an exemplary communications architecture 1200 suitable for implementing various embodiments of the RSS aggregation system 100 as previously described. The communications architecture 1200 includes various common communications elements, such as a transmitter, receiver, transceiver, radio, network interface, baseband processor, antenna, amplifiers, filters, power supplies, and so forth. The embodiments, however, are not limited to implementation by the communications architecture 1200. As shown in FIG. 12, the communications architecture 1200 comprises includes one or more clients 1202 and servers 1204. The clients 1202 may implement the user source web pages 905-N. The servers 1204 may implement the server device 920. The clients 1202 and the servers 1204 are operatively connected to one or more respective client data stores 1208 and server data stores 1210 that can be employed to store information local to the respective clients 1202 and servers 1204, such as cookies and/or associated contextual information.

The clients 1202 and the servers 1204 may communicate information between each other using a communication framework 1206. The communications framework 1206 may implement any well-known communications techniques and protocols. The communications framework 1206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators). The communications framework 1206 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1202 and the servers 1204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
   a machine readable storage media encoded with instructions;
   a processor circuit configured to communicate with the machine readable storage media;
   a monitor component operative on the processor circuit to receive a feed from a feed reader, identify a link address from the feed, compare the identified link address to a plurality of stored destination addresses, and generate an identifier parameter for the feed when the identified link address matches a stored destination address, the identifier parameter comprising an indicator attached to the link address; and
   an aggregation application operative on the processor circuit to receive a plurality of identifier parameters from the monitor component, count the identifier parameters associated with each of a plurality of particular destination web sites to determine an aggregated number of feeds for each of the particular destination web sites, and select multimedia content based on the aggregated number of feeds received for destination web sites.

2. The apparatus of claim 1 wherein the feed is a RSS (Really Simple Syndication) feed and the monitor component is a RSS monitor component.

3. The apparatus of claim 2 wherein the feed reader comprises a RSS reader configured to monitor RSS feeds from a source web site and send RSS feed information to the RSS monitor component.

4. The apparatus of claim 3 wherein the RSS reader is a first RSS reader, the apparatus further comprising a plurality of RSS readers each associated with a corresponding one of a source web site, each of the RSS readers monitoring RSS feeds from each of the source web sites and sending the RSS feed information to the RSS monitor component.

5. The apparatus of claim 3 further comprising a RSS link disposed between the source web site and the RSS reader, the RSS link configured to provide RSS feeds from the source web site to the RSS reader.

6. The apparatus of claim 3 wherein the RSS monitor component is configured to receive the RSS feed information from the RSS reader and determine if the RSS feed is associated with a particular one of a plurality of destination web sites.

7. The apparatus of claim 3 wherein the RSS monitor component further comprising a RSS parsing component configured to receive the RSS feed information and parse the feed information to extract a link associated with a destination web site.

8. The apparatus of claim 7 wherein the RSS monitor component further comprising a RSS identifier component configured to compare a link address parsed-out by the RSS parsing component with a link address associated with a particular one of a plurality of destination web sites.

9. The apparatus of claim 2 wherein the aggregation application is configured to retrieve multimedia content from the one or more destination web sites based on the aggregated number of RSS feeds and configure the multimedia to be displayed based on the aggregated RSS feeds.

10. A computer-implemented method, comprising:
   monitoring a link path from a source for a request feed received from a feed reader;
   reading the request feed;
   identifying a link address from the request feed;
   comparing the identified link address to a plurality of stored destination addresses;
   generating an identifier parameter for each of a plurality of request feeds when the identified link address matches a stored destination address, the identifier parameter comprising an indicator attached to the link address;

counting the identifier parameters associated with each of a plurality of particular destination web sites to determine an aggregated number of feeds for each of the particular destination web sites; and displaying multimedia content associated with a particular one of the plurality of web sites corresponding to the request feeds for the particular one of the plurality of web sites in accordance with the determined aggregated number of feeds.

11. The computer-implemented method of claim 10 further comprising displaying multimedia content associated with the web sites further comprises displaying multimedia content corresponding to a largest aggregated number of feeds.

12. The computer implemented method of claim 11 wherein determining one or more of a plurality of web sites the request feed is associated with further comprises grouping the request feeds by a content category.

13. The computer implemented method of claim 12 further comprising, before displaying the multimedia content:

grouping the multimedia information associated with the grouped requests based on the content category; and displaying the grouped multimedia content on a common web page.

14. The computer-implemented method of claim 13 further comprising displaying an advertising message with the grouped multimedia content based on the content category.

15. The computer-implemented method of claim 11 wherein counting the identifier parameters that indicate that a request feed is associated with the particular destination web sites to determine an aggregated number of feeds is performed within a first defined time period and the displaying content associated with the web sites corresponding to the largest number of aggregated request feeds is performed for a second defined time period.

16. The computer-implemented method of claim 11 wherein displaying multimedia content associated with the web sites further comprises generating at least one brick on a webpage including multimedia content corresponding to the largest aggregated number of request feeds.

17. The computer implemented method of claim 10 wherein reading the request feed further comprises parsing the request feed to obtain a link address associated with the destination web site.

18. The computer implemented method of claim 17 wherein determining one or more of a plurality of web sites the request feed is associated with further comprises comparing the link address parsed from the request feed to a plurality of stored webpage addresses.

19. A computer-implemented method, comprising:

monitoring a link path from a source for a request feed received from a feed reader;

reading the request feed;

identifying a link address from the request feed;

comparing the identified link address to a plurality of stored destination addresses;

generating an identifier parameter for the request feed when the identified link address matches a stored destination address, the identifier parameter comprising an indicator attached to the link address;

counting the identifier parameters associated with each of a plurality of particular destination web sites to determine an aggregated number of request feeds for each of the particular destination web sites;

comparing the aggregated number of request feeds of each of the plurality of the particular destination websites;

grouping the aggregated number of requests feeds based on a content category;

determining which of the plurality of web sites has the largest aggregated number request feeds; and displaying multimedia content associated with the web sites corresponding to the largest aggregated number request feeds.

20. The computer implemented method of claim 19 further comprising:

grouping the multimedia information associated with the aggregated requests based on the content category; and displaying the grouped multimedia information on a common web page.

* * * * *